(12) United States Patent
Smolic et al.

(10) Patent No.: US 9,214,040 B2
(45) Date of Patent: Dec. 15, 2015

(54) INTERMEDIATE VIEW SYNTHESIS AND MULTI-VIEW DATA SIGNAL EXTRACTION

(75) Inventors: Aljosa Smolic, Zurich (CH); Karsten Mueller, Berlin (DE); Kristina Dix, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 176 days.

(21) Appl. No.: 13/078,653

(22) Filed: Apr. 1, 2011

(65) Prior Publication Data

US 2011/0261050 A1 Oct. 27, 2011

Related U.S. Application Data

(63) Continuation of application No. PCT/EP2009/006977, filed on Sep. 28, 2009.

(60) Provisional application No. 61/102,286, filed on Oct. 2, 2008.

(51) Int. Cl.
G06T 15/00 (2011.01)
G06T 15/20 (2011.01)
(Continued)

(52) U.S. Cl.
CPC .......... G06T 15/20 (2013.01); G06T 9/001 (2013.01); G06T 15/205 (2013.01);
(Continued)

(58) Field of Classification Search
CPC ............. G06T 15/205; H04N 13/0011; H04N 13/0014
USPC ........................................................ 345/629
See application file for complete search history.

(56) References Cited

U.S. PATENT DOCUMENTS 6,201,581 B1 3/2001 Moriwake et al.
2002/0158873 A1 10/2002 Williamson et al.
(Continued)

FOREIGN PATENT DOCUMENTS

CN 1223058 7/1999
CN 1694512 11/2005
(Continued)

OTHER PUBLICATIONS

Hiruma, K. et al., "View Generation for a Virtual Camera Using the Multiple Depth Maps", IEICE Transactions on Information and Systems (J84-D-II), vol. 5, Japan, with English abstact, May 2001, pp. 805-811.
(Continued)

*Primary Examiner* — Jeffery A Brier
(74) *Attorney, Agent, or Firm* — Michael A. Glenn; Perkins Coie LLP

(57) ABSTRACT

An intermediate view synthesis apparatus for synthesizing an intermediate view image from a first image corresponding to a first view and a second image corresponding to a second view different from the first view, the first and second images including depth information, wherein the second image being is divided-up into a non-boundary portion, and a foreground/background boundary region, wherein the intermediate view synthesis apparatus is configured to project and merge the first image and the second image into the intermediate view to obtain an intermediate view image, with treating the foreground/background boundary region subordinated relative to the non-boundary portion. A multi-view data signal extraction apparatus for extracting a multiview data signal from a multi-view representation including a first image corresponding to a first view and a second image corresponding to a second view being different from the first view is also described, the first and second images including depth information.

19 Claims, 18 Drawing Sheets

(51) Int. Cl.
  *H04N 13/00* (2006.01)
  *G06T 9/00* (2006.01)
  *H04N 19/597* (2014.01)
  *H04N 19/29* (2014.01)
  *H04N 19/543* (2014.01)
  *H04N 19/86* (2014.01)

(52) U.S. Cl.
  CPC ...... *H04N 13/0011* (2013.01); *H04N 13/0022* (2013.01); *H04N 19/29* (2014.11); *H04N 19/543* (2014.11); *H04N 19/597* (2014.11); *H04N 19/86* (2014.11); *H04N 2213/005* (2013.01)

(56) References Cited

U.S. PATENT DOCUMENTS

| 2006/0028473 | A1 | 2/2006 | Uyttendaele et al. | |
| 2008/0192112 | A1 | 8/2008 | Hiramatsu et al. | |
| 2010/0026712 | A1* | 2/2010 | Aliprandi et al. | 345/629 |

FOREIGN PATENT DOCUMENTS

| CN | 101175223 | 5/2008 |
| CN | 101180891 | 5/2008 |
| JP | 2000227960 A | 8/2000 |
| JP | 2006012161 A | 1/2006 |
| JP | 2008129864 A | 6/2008 |
| JP | 2010-191396 | 9/2010 |

OTHER PUBLICATIONS

Fehn C: "Depth-image-based rendering (DIBR), compression, and transmission for a new approach on 3D-TV"; May 31, 2004; Proceedings of the International Society for the Optical Engineering, SPIE, US, vol. 5291,, pp. 93-104, XP002444222.

Zitnick C L et al: "High-Quality video view interpolation using a layered representation"; Aug. 8, 2004; ACM Transactions on Graphics, vol. 23, No. 3, pp. 600-608, XP002354522, US.

Int'l Preliminary Report on Patentability, mailed Oct. 27, 2010 in related PCT application No. PCT/EP2009/006977, 14 pages.

Int'l Search Report and Written Opinion, mailed Jan. 15, 2010, in related PCT application No. PCT/EP2009/006977, 15 pages.

Hiruma, K. et al., "View Generation for a Virtual Camera Using the Multiple Depth Maps", IEICE Transactions on Information and Systems (J84-D-II), vol. 5, Japan, with English abstract, May 2001, pp. 805-811.

"Philips 3D Solutions, Technology Backgrounder WOWvx for amazing viewing experiences"; retrieved online from url: http://www.hitech-projects.com/euprojects/3d4you/www.3d4you.eu/images/PDFs/stereovis_philips_background.pdf, May 2006, 2 pages.

* cited by examiner

INTERMEDIATE VIEW SYNTHESIS AND MULTI-VIEW DATA SIGNAL EXTRACTION

CROSS-REFERENCE TO RELATED APPLICATIONS

This application is a continuation of co-pending International Application No. PCT/EP2009/006977 filed 28 Sep. 2009, and claims priority to U.S. Application No. 61/102,286, filed Oct. 2, 2008, which is incorporated herein by reference in its entirety.

BACKGROUND OF THE INVENTION

The present invention relates to intermediate view synthesis and multi-view data signal extraction/construction.

3D video (3DV) provides the viewer with a depth perception of the observed scenery. This is also referred to as stereo, which is, however, a term too restricted to the classical technology of using 2 videos. Recently, 3DV gains rapidly increasing attention spanning systems and applications from mobile phones to 3D cinema [25]. Technology is maturating covering the whole processing chain from camera systems to 3D displays. Awareness and interest is growing on consumer side, who wish to experience the extended visual sensation, as well as on business side including content providers, equipment producers and distributors.

Creating a 3D depth impression entails that a viewer looking at a 3D display sees a different view with each eye. These views should correspond to images taken from different viewpoints with human eye distance. In other words, providing the user with a natural depth impression of the observed scenery may involve using specific 3D viewing technology, which ensure that each eye only sees one image of a stereo pair presented simultaneously [17]. In the past, users had to wear specific glasses (anaglyph, polarization, shutter). Together with limited visual quality this is regarded as main obstacle for wide success of 3DV systems in home user environments, while other types of applications such as 3D cinema are expected to grow rapidly over the next years due to their high visual quality. To be more precise, a 3D display emits two or more views at the same time and ensures that a viewer sees such a stereo pair from a certain viewpoint [17]. Specific glasses based on anaglyph, polarization, or shutter technology may have been used to achieve this in the past but are today still appropriate for a wide range of applications. For instance, 3D cinema applications based on glasses (such as IMAX® theatres) are well established. In a cinema theatre the user is sitting in a chair without much possibility to move and is usually paying almost full attention to the presented movie. Wearing glasses is widely accepted in such a scenario and motion parallax is not a big issue. 3D cinema with display technology based on glasses is therefore expected to remain the standard over the next years. This market is expected to grow further and more and more movies are produced in 2D for classical cinema as well as in a 3D version for 3D enabled theatres. It is expected that this will broaden awareness of users and with this also the acceptance and create demand for 3DV applications in the home.

In a living room environment, however, the user expectations are very different. The necessity to wear glasses is considered as a main obstacle for success of 3D video in home user environments. Now this is overcome with multiview autostereoscopic displays [17]. Several images are emitted at the same time but the technology ensures that users only see a stereo pair from a specific viewpoint. 3D displays are on the market today that are capable of showing 9 or more different images at the same time, of which only a stereo pair is visible from a specific viewpoint. With this multi-user 3D sensation without glasses is enabled for instance in a living room. A group of people may enjoy a 3D movie in the familiar sofa-TV environment without glasses but with all social interactions that we are used to. When moving around a natural motion parallax impression can be supported if consecutive views are arranged properly as stereo pairs.

However, transmitting 9 or more views of the same 3D scenery from slightly different viewpoints to the home user is extremely inefficient. The transmission costs would not justify the additional value. Fortunately, alternative 3D video formats allow for reducing the raw data rate significantly. When using the multiview video plus depth (MVD) format only a subset M of the N display views is transmitted. For those M video streams additional per-pixel depth data is transmitted as supplementary information. At the receiver depth image based rendering (DIBR) is applied to interpolate all N display views from the transmitted MVD data [15].

Thus, a multiview video plus depth (MVD) format allows reducing the raw data rate for 3DV systems drastically. Only a subset M of the N display views is transmitted. Additionally, depth data are transmitted for the subset M. The non-transmitted views can be generated by intermediate view interpolation at the receiver given the transmitted data [17].

3DV systems are capable to support head motion parallax viewing by displaying multiple views at the same time. Among many others for instance high-resolution LCD screens with slanted lenticular lens technology and 9 simultaneous views are commercially available from Philips [28]. The principle for head motion parallax support with a 3D display is illustrated in FIG. 20. A user at position 1 sees views 1 and 2 with right and left eye respectively only. Another user at position 3 sees views 6 and 7, hence multi-user 3D viewing is supported.

Assume a user moves from position 1 to position 2. Now views 2 and 3 are visible with the right and left eye respectively. If V1 and V2 is a stereo pair with proper human eye distance baseline, then V2 and V3 as well and so on, a user moving in front of such a 3D display system will perceive a 3D impression with dis-occlusions and occlusions of objects in the scenery depending on their depth. This motion parallax impression will not be seamless and the number of different positions is restricted to N−1.

To be more precise, multiview autostereoscopic displays process N synchronized video signals showing the same 3D scene from slightly different viewpoints. Compared to normal 2D video this is a tremendous increase of raw data rate. It has been shown that specific multiview video coding (MVC) including inter-view prediction of video signals taken from neighboring viewpoints can reduce the overall bit rate by 20% [20], compared to independent coding of all video signals (simulcast). This means a reduction by 20% of the single video bitrate multiplied by N. For a 9-view display MVC therefore still necessitates 7.2 times the corresponding single video bitrate. Such an increase is clearly prohibitive for the success of 3DV applications. Further, it has also been shown in [20] that the total bitrate of MVC increases linearly with N. Future displays with more views would therefore necessitate even higher total bitrates. Finally, fixing the number of views in the transmission format as done with MVC does not provide sufficient flexibility to support any type of current and future 3D displays.

For 2-view displays (or small number of views displays) a different approach was demonstrated to provide both high compression efficiency as well as extended functionality. Instead of transmitting a stereo video pair, one video and an associated per-pixel depth map is used. The depth map assigns a scene depth value to each of the pixels of the video signal, and with that provides a 3D scene description. The depth map can be treated as monochromatic video signal and coded using available video codecs. This way video plus depth (V+D) is defined as 3DV data format [7]. A corresponding standard known as MPEG-C Part 3 has been recently released by MPEG [11], [12]. From decoded V+D a receiver can generate a second video as stereo pair by DIBR. Experiments have shown that depth data can be compressed very efficiently in most cases. Only around 10-20% of the bitrate that may be used for the corresponding color video may be used to compress depth at a sufficient quality. This means that the final stereo pair rendered using this decoded depth is of same visual quality as if the 2 video signals were transmitted instead. However, it is known that DIBR introduces artifacts. Generating virtual views necessitates extrapolation of image content to some extend. From a virtual viewpoint parts of the 3D scene may become visible that are occluded behind foreground objects in the available original video. If the virtual viewpoint is close to the original camera position (e.g. corresponding to V1 and V2 in FIG. 20) masking of uncovered image regions works well with limited artifacts. Therefore V+D is an excellent concept for 3D displays with a small number of views. However, with increasing distance of the virtual viewpoint also the extrapolation artifacts increase. The concept of V+D is therefore not suitable for 3DV systems with a large number of views and motion parallax support over a wide range.

In consequence, neither MVC nor V+D are useful for advanced 3D display systems with a large number of views. A solution is an extension and combination to MVD as illustrated in FIG. 20. 9 views V1-V9 are displayed. Direct encoding with MVC would be highly inefficient. Transmitting only one video with a depth map e.g. V5+D5 would result in unacceptable quality of outer views. Using the MVD format a subset of M=3 views with depth maps is transmitted to the receiver. Intermediate views V2-V4 and V6-V8 are generated by DIBR. They are close enough to available original views to minimize extrapolation errors. Further, they can be interpolated from 2 directions (left and right neighbor view), thus the problem of uncovering can be widely minimized. For instance, regions to be generated for the virtual view that are occluded in the left view are very likely visible in the right view. However, there is still the possibility that parts are occluded in both original views and finally are to be extrapolated.

This advanced 3DV system concept includes a number of sophisticated processing steps that are partially unresolved and still necessitate research. Acquisition systems still have to be developed and optimized, which includes multi camera systems, possibly depth capture devices, as well as other types of maybe only supporting sensors and sources of information such as structured light [8], [22]. Sender side signal processing includes a lot advanced algorithms such as camera calibration, color correction, rectification, segmentation as well as depth estimation or generation. The latter is crucial for DIBR since any error of depth estimation results in reduced quality of rendered output views. It is a topic widely studied in computer vision literature, which may include semi-automatic processing as well [16], [18], [26], [29]. Optimum parameterization of the generic 3DV format still needs to be investigated, including the number of transmitted views with depth and the setting/spacing. Most efficient compression of the MVD data is still to be found, especially optimum treatment of depth. As usual transmission issues should be considered for different channels. Finally after decoding, the N output views are rendered out of the decoded MVD data. Here high quality with few artifacts is crucial for the success of the whole concept.

Finally, high quality view interpolation with a minimum of noticeable artifacts is a crucial prejudice for the success of 3DV systems. Interpolation artifacts especially occur along object boundaries with depth discontinuities. It would, therefore, be favorable to have an interpolation concept that allows for avoiding artifacts along such edges. Further, it would be favorable if the compression ratio for storing the data for 3DV could be reduced without significantly reducing or even maintaining the obtainable 3DV result.

SUMMARY

According to an embodiment, an intermediate view synthesis apparatus for synthesizing an intermediate view image from a first image corresponding to a first view and a second image corresponding to a second view different from the first view, the first and second images having depth information, wherein the second image is divided-up into a non-boundary portion and a foreground/background boundary region, wherein the foreground/background boundary region of the second image has a foreground boundary portion and a background boundary portion being disjoint to the foreground boundary portion, and wherein the intermediate view synthesis apparatus is configured to project and merge the first image and the second image into the intermediate view to achieve an intermediate view image, with using the background boundary portion of the foreground/background boundary region merely to fill holes otherwise occurring in the intermediate view image, and using the foreground boundary portion of the foreground/background boundary region, to project and merge into the intermediate view, may have: a projector/merger for projecting and merging the non-boundary portion and the foreground boundary portion of the second image along with at least a part of the first image into the intermediate view to achieve a preliminary intermediate view image; and a projector/filler for projecting the background boundary portion of the second image into, and filling the holes in the preliminary intermediate view image by the projected background boundary portion of the second image.

According to another embodiment, a multi-view data signal extraction apparatus for extracting a multiview data signal from a multi-view representation having a first image corresponding to a first view and a second image corresponding to a second view being different from the first view, the first and second images having depth information, may have: a detector for detecting a foreground/background boundary in the second image; a determiner for determining a background boundary portion of the second image along the foreground/background boundary; a projector for projecting the second image without the background boundary portion into the first view to achieve a projected version of the second image having a disoccluded area; and an inserter for inserting the second image along with a portion of the first image, depending on a location of the disoccluded area within the projected version of the second image, into the multiview data signal.

According to another embodiment, a multi-view data signal may have: data about a first image corresponding to a first view and a second image corresponding to a second view being different from the first view, the first and second images having depth information, wherein merely a portion of the first image is included in the multi-view data signal while the disjoint portion thereof is discarded in the multi-view data signal, the portion depending on a location of a disoccluded area within a projected version of the second image resulting from projecting the second image without a background boundary portion extending along a foreground/background boundary in the second image, into the first view.

According to another embodiment, an intermediate view synthesis method for synthesizing an intermediate view image from a first image corresponding to a first view and a second image corresponding to a second view different from the first view, the first and second images having depth information, wherein the second image is divided-up into a non-boundary portion and a foreground/background boundary region, wherein the foreground/background boundary region of the second image has a foreground boundary portion and a background boundary portion being disjoint to the foreground boundary portion, may have the steps of: projecting and merging the non-boundary portion and the foreground boundary portion of the second image along with at least a part of the first image into the intermediate view to achieve a preliminary intermediate view image; and projecting the background boundary portion of the second image into, and filling the holes in the preliminary intermediate view image by the projected background boundary portion of the second image.

According to another embodiment, a multi-view data signal extraction method for extracting a multiview data signal from a multi-view representation having a first image corresponding to a first view and a second image corresponding to a second view being different from the first view, the first and second images having depth information, may have the steps of: detecting a foreground/background boundary in the second image; determining a background boundary portion along the foreground/background boundary; projecting the second image without the background boundary portion into the first view to achieve a projected version of the second image having a disoccluded area; and inserting the second image along with a portion of the first image, depending on a location of the disoccluded area within the projected version of the second image, into the multiview data signal.

According to another embodiment, a computer program may have: instructions for performing, when running on a computer, a method for synthesizing an intermediate view image from a first image corresponding to a first view and a second image corresponding to a second view different from the first view, the first and second images having depth information, wherein the second image is divided-up into a non-boundary portion and a foreground/background boundary region, wherein the foreground/background boundary region of the second image has a foreground boundary portion and a background boundary portion being disjoint to the foreground boundary portion, and which intermediate view synthesis method may have the steps of: projecting and merging the non-boundary portion and the foreground boundary portion of the second image along with at least a part of the first image into the intermediate view to achieve a preliminary intermediate view image; and projecting the background boundary portion of the second image into, and filling the holes in the preliminary intermediate view image by the projected background boundary portion of the second image.

According to another embodiment, a computer program may have: instructions for performing, when running on a computer, a method for extracting a multiview data signal from a multi-view representation having a first image corresponding to a first view and a second image corresponding to a second view being different from the first view, the first and second images having depth information, which multiview data signal extraction method may have the steps of: detecting a foreground/background boundary in the second image; determining a background boundary portion along the foreground/background boundary; projecting the second image without the background boundary portion into the first view to achieve a projected version of the second image having a disoccluded area; and inserting the second image along with a portion of the first image, depending on a location of the disoccluded area within the projected version of the second image, into the multiview data signal.

A basic idea underlying the present invention is that treating a foreground/background boundary region subordinated relative to a non-boundary portion helps to avoid or reduce artifacts when projecting and merging images of different views, and that in turn, this knowledge may also be used to remove irrelevant information from multi-view data signals in an quality preserving way.

Thus, in accordance with the first aspect of the present invention, an intermediate view synthesis for synthesizing an intermediate view image from a first image corresponding to a first view and a second image corresponding to a second view different from the first view is preformed by detecting a foreground/background boundary in the second image based on the depth information thereof, determining a foreground/background boundary region as a region extending thereof along and using this region merely for filling holes in a preliminary intermediate view image obtained by projecting and merging the remaining portion of the second image along with at least a part of the first image. By this measure, the respective foreground/background boundary region is merely used in a subordinate manner relative to the remaining portion of the second image and therefore, does not negatively affect the project-and-merge result with, on the other hand, nevertheless contributing to filling holes otherwise occurring.

According to a second aspect of the present invention, a multi-view data signal extraction for extracting a multi-view data signal from a multi-view representation comprising a first image corresponding to a first view and a second image corresponding to a second view being different from the first view, by detecting a foreground/background boundary in the second image, determining a left-away boundary portion of the second image as extending along the foreground/background boundary and projecting the second image without the left-away boundary portion into the first view so as to obtain a projected version of the second image having a disoccluded area. Then, the second image along with a portion of the first image is inserted into the multi-view data signal, with the insertion of the portion of the first image depending on a location of the disoccluded area within the projected version of the second image. For example, the portion of the first image to be inserted into the multi-view data signal is determined from the location of the disoccluded area within the projected version of the second image.

In accordance with embodiments of the present invention, the foreground/background boundary region is obtained by detecting the foreground/background boundary, defining an n-sample wide area therearound and splitting-up this area into a foreground boundary portion on the one hand, and a background boundary portion on the other hand with the background boundary portion representing the aforementioned left-away boundary portion and the afore-mentioned background boundary portion merely to be used for filling holes in the preliminary intermediate view image, respectively.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
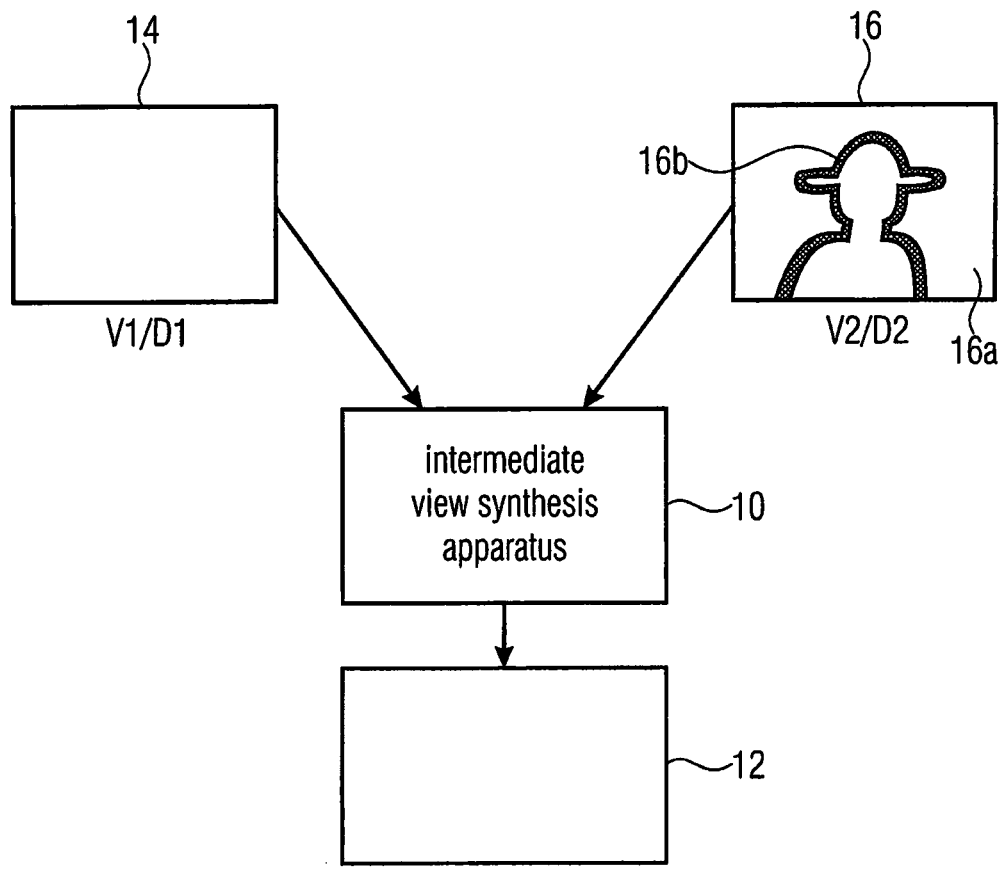
FIG. 1a shows a block diagram of an intermediate view synthesis apparatus according to an embodiment of the present invention.

FIG. 1a shows an intermediate view synthesis apparatus 10 for synthesizing an intermediate view image 12 from a first image 14 corresponding to a first view V1 and a second image 16 corresponding to a second view V2 different from the first view V1, the first and second images comprising depth information D1 and D2. The first and second images 14 and 16 may have mono chrome or color information V1 and V2 associated with the depth information D1 and D2. In particular, both the depth as well as the color information may comprise a sample value per pixel, although it might be possible that the spatial resolution of both may be different.

The second image 16 is divided-up into a non-boundary portion 16a, illustrated as the white portion in FIG. 1a, and a foreground/background boundary region, illustrated as the hatched portion in FIG. 1a, wherein the intermediate view synthesis apparatus is configured to project and merge the first image 14 and the second image 16 into the intermediate view to obtain the intermediate view image 12, with treating the foreground/background boundary region 16b subordinated relative to the non-boundary portion 16a.

In accordance with embodiments described further below, the intermediate view synthesis apparatus 10 is configured to use at least a part of the foreground/background boundary region 16b merely to fill holes otherwise occurring in the intermediate view image 12 with using a disjoint portion of the second image 16, being disjoint to the part of the foreground/background boundary region 16b, to project and merge into the intermediate view 12.

Figure 1B:
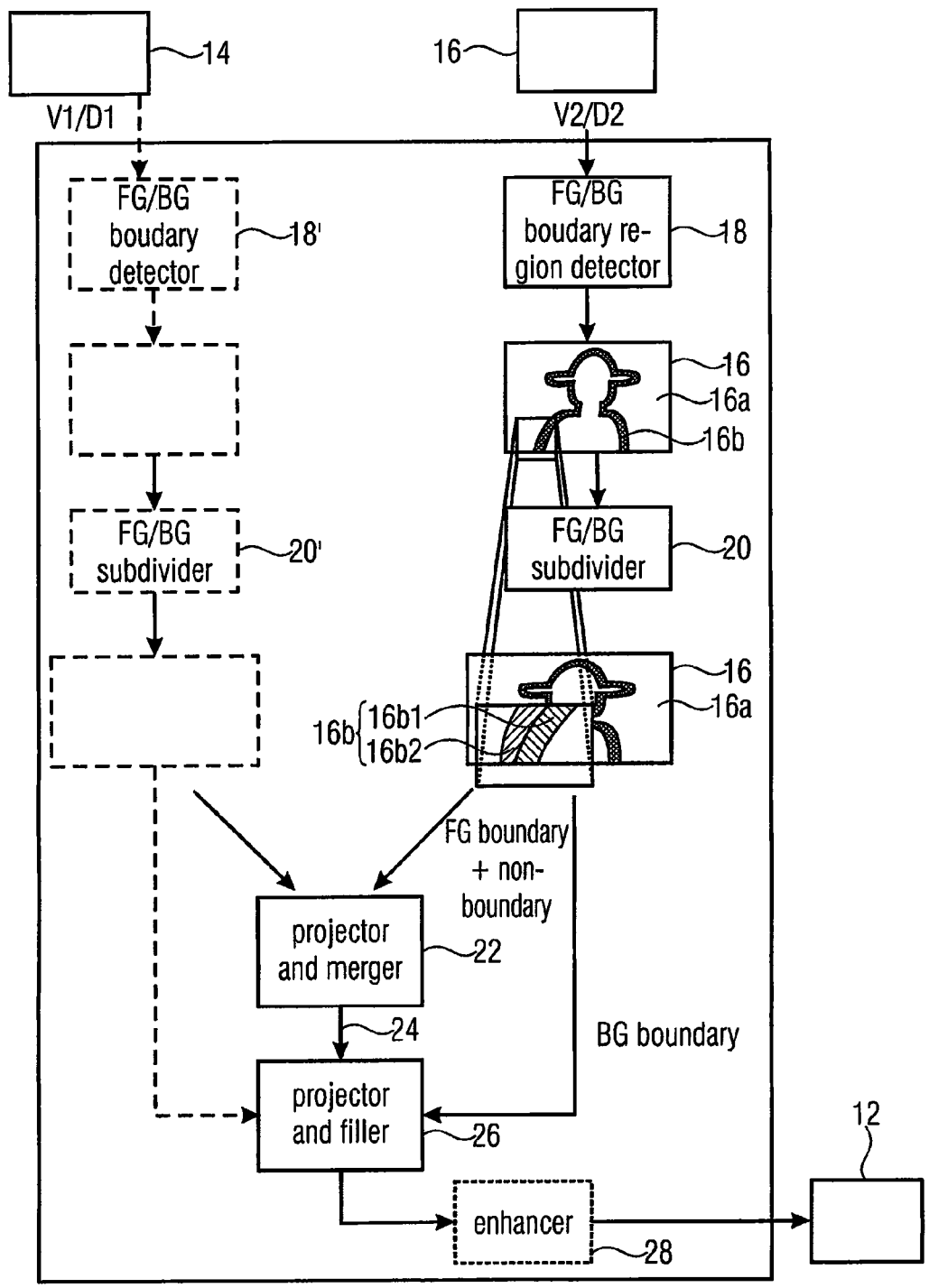
FIG. 1b shows a block diagram of an intermediate view synthesis apparatus according to a further embodiment of the present invention.

In accordance with FIG. 1b, a further embodiment of an intermediate view synthesis 10 is described in more detail. In accordance with this embodiment, the foreground/background boundary region 16b of the second image 16 is divided-up into a foreground boundary portion and a background boundary portion with the background boundary region forming the afore-mentioned part to be used for hole-filling. Thus, the part mentioned above, could correspond to that background boundary region.

The intermediate view synthesis apparatus 10 of FIG. 1b comprises a foreground/background boundary detector 18 as a means for detecting the foreground/background boundary region 16b in the second image 16, and a foreground/background sub-divider 20 as a means for dividing-up the foreground/background boundary region 16b of the second image into the foreground boundary portion 16b1 and the background boundary portion 16b2 so that the second image 16 is divided-up into the non-boundary portion 16a, the foreground boundary portion 16b1 and the background boundary portion 16b2. Further, the intermediate view synthesis apparatus 10 comprises a projecting-and-merging stage 22 for projecting and merging the non-boundary portion 16a and the foreground boundary portion 16b1 of the second image 16 along with at least a part of the first image 14 into the intermediate view to obtain a preliminary intermediate view image illustrated as arrow 24.

A projecting-and-filling stage 26 is provided for projecting the background boundary portion 16b2 of the second image 16 into the intermediate view and filling the holes in the preliminary intermediate view image 24 by the projected background boundary portion of the second image 16 thereby obtaining intermediate view image 12.

Comparing the embodiments of FIGS. 1a and 1b, it becomes clear that in case of FIG. 1b the boundary region detection and division is performed in the apparatus while in the embodiment of FIG. 1a this is assumed to have already been done and the information thereabout being associated with the second image 16b such as in form of side information. Accordingly, according to a further embodiment, the intermediate view synthesis apparatus 10 could comprise a means for obtaining layer information discriminating the non-boundary portion 16a, the foreground boundary portion 16b1 and the background boundary portion 16b2 of the second image from a multi-view data signal, the latter means replacing blocks 18 and 20 in FIG. 1b.

As further illustrated in FIG. 1b by dotted lines, the intermediate view synthesis apparatus 10 possibly also comprises a foreground/background boundary detector 18' as a means for detecting a foreground/background boundary region in the first image 14, and a foreground/background sub-divider 20' as a means for dividing-up the foreground/background boundary region of the first image into a foreground boundary portion and a background boundary portion. In even other words, in the Intermediate view synthesis apparatus 10, the means 18 for detecting could be configured to detect also a foreground/background boundary region in the first image 14, and the means 20 could be configured to also divide-up the foreground/background boundary region of the first image 14 into a foreground boundary portion and a background boundary portion so that the first image 14 would also divided-up into a non-boundary portion, a foreground boundary portion and a background boundary portion. In this case, the projecting-and-merging stage 22 could be configured to project and merge the non-boundary portion and the foreground boundary portion of the first and second images 14 and 16 into the intermediate view to obtain the preliminary intermediate view image 24, and the projecting-and-filling stage 26 could be configured to project the background boundary portion of the first and second images 14 and 16 into and fill the holes in the preliminary intermediate view image 24 by the projected background boundary portion of the first and second images 14 and 16.

In an intermediate view synthesis apparatus 10 according to an alternative embodiment, a means for obtaining layer information from a multi-view data signal could obtain layer information discriminating, at least, a non-boundary portion and a background boundary portion of the first image from the multi-view data signal. Detector 18' and sub-divider 20' would be unnecessary. The intermediate view synthesis apparatus 10 would comprise the just-mentioned obtainer instead. The means 22 for projecting and merging, however, would be configured to project and merge the non-boundary portion 16a and the foreground boundary portion 16b1 of the second image 12 and the non-boundary portion of the first image 14 into the intermediate view to obtain the preliminary intermediate view image 24, and the means 26 for projecting and filling would be configured to project the background boundary portion of the first and second images 14 and 16 into and fill the holes in the preliminary intermediate view image 24 by the projected background boundary portion of the first and second images 14 and 16.

Even alternatively, the multi-view data signal could comprise, for example, as side information, layer information discriminating a non-boundary portion, a foreground boundary portion and a background boundary portion of the first image 14. The Intermediate view synthesis apparatus 10 according to this embodiment, would, accordingly, comprise a means for obtaining this layer information discriminating the non-boundary portion, the foreground boundary portion and the background boundary portion of the first image 14, wherein the means 22 for projecting and merging would be configured to project and merge the non-boundary portion and the foreground boundary portion of the first and second images 14 and 16 into the intermediate view to obtain the preliminary intermediate view image 24, with the means 26 for projecting and filling being configured to project the background boundary portion of the first and second images 14 and 16 into and fill the holes in the preliminary intermediate view image 24 by the projected background boundary portion of the first and second images 14 and 16.

The detector 18 may, for example, comprise an edge detector for detecting an edge in the depth information D2 with an n-sample-wide area around the edge representing the foreground/background boundary region 16b2. The sub-divider 20, in turn, may be configured to split this n-sample-wide area into the foreground boundary portion and the background boundary portion. n may be, for example, between 3 and 21, both inclusively. For example, the sub-divider 20 may be configured to perform the splitting by comparing a depth of the depth information D2 at a sample/pixel of the foreground/background boundary region 16b with a threshold to decide as to whether the sample/pixel belongs to the foreground boundary portion 16b1 or the background boundary portion 16b2. In this regard, the sub-divider may be configured to derive the threshold value by computing a central tendency such as the mean value or median value, of the depth values of the depth information D2. In particular, the sub-divider may be configured to derive the threshold value locally, by computing the central tendency for a respective sample/pixel of the foreground/background boundary region 16b from the depth values of the depth information D2 at samples/pixels neighboring the respective sample/pixel such as based on the neighboring samples/pixels belonging to the foreground/background boundary region 16b and neighboring the respective sample/pixel.

In the above embodiment where both the first and second images 14 and 16 are divided into non-boundary and boundary region, the projecting-and-merging stage 22 may be configured to project and merge the non-boundary part of the first and second images 14 and 16 into the intermediate view to obtain a non-boundary intermediate view image, with the merging of the non-boundary portions comprising averaging between the first and second images 14 and 16, and project and merge the foreground boundary portion of the first and second images 14 and 16 into the non-boundary intermediate view image 24 with the merging of the foreground boundary portions comprising a selection between samples of the non-boundary intermediate view image 24 and co-located samples resulting from the projection of the foreground boundary portion of the first and second images 14 and 16 rather than an averaging thereof.

As for as the projection mechanism is concerned, the projecting-and-merging stage 22 and the projecting-and-filling stage 26 may be configured to perform the respective projection into the intermediate view by projecting samples from 2D to 3D by use of the associated depth information D1 and D2, respectively, to obtain 3D world points and projecting the 3D world points into the intermediate view. In particular, the projecting-and-merging stage 22 and the projecting-and-filling stage 26 may be configured to compute a projecting matrix by interpolating between projecting matrices of the first view and the second view and perform the projection of the 3D world points by use of the projection matrix. In effect, the projecting-and-merging stage 22 and the projecting-and-filling stage 26 may be configured to perform the respective projection into the intermediate view by two-dimensionally—or in pixel plane—shifting the sample positions at an amount depending on a deviation from the intermediate view. Of course, the in-plane shifting may be restricted to a shifting along one dimension, such as along the row/line direction because, for example, all views have been captured using the same magnification, resolution etc. with concurrently having the pixel lines registered to each other in vertical direction. In the following, the general terms in-pixel-plane or two-dimensionally shifting are used, and they shall encompass the just-outlined possibility to restrict the shifting to one dimension. A further two-dimensional interpolation may be used to map projected points/pixels into the regular grid of pixels of the target, i.e. intermediate, view. Merging may be done by simply using both the projected pixels of a first view and the projected pixels of a second view in order to obtain the target view image. Again, an interpolation may be used to unite this projected pixels into one regular pixel grid of the target view.

Further, it should be noted that, optionally, an enhancer 28 for enhancing the intermediate view image 24 by filtering and/or extrapolation into remaining holes, of the intermediate view image 24 could be present. Such an enhancer 28 could enhance the intermediate view image by detecting a foreground/background boundary region of the intermediate view image 24 and performing a low-pass filtering within the foreground/background boundary region of the intermediate view image 24.

In the following, detailed examples of the forgoing embodiments will be described where the first and second images are part of an MVD or LDV video, and some examples where the intermediate view synthesis apparatus is part of a 3DTV display system. However, before that, another embodiment is described suitable for efficiently coding multiple views.

Figure 1C:
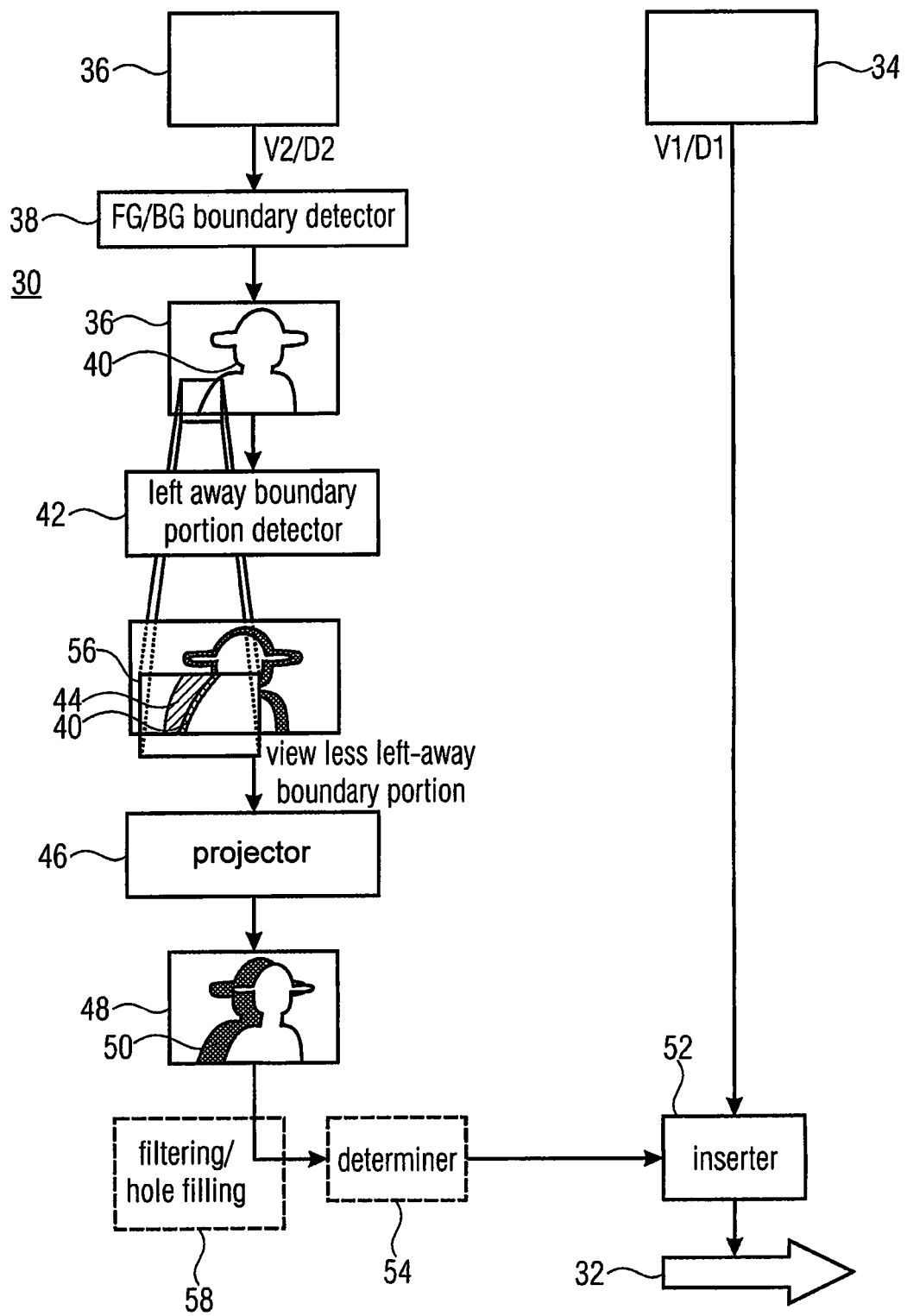
FIG. 1c shows a multi-view data signal extraction apparatus according to an embodiment of the present invention.

FIG. 1c shows a multi-view data signal extraction apparatus 30 for extracting a multiview data signal illustrated as an arrow 32 from a multi-view representation comprising a first image 34 corresponding to a first view and a second image 36 corresponding to a second view being different from the first view, the first and second images 34 and 36 comprising depth information D1 and D2, respectively. The multiview data signal extraction apparatus 30 comprises a foreground/background boundary detector 38 for detecting a foreground/background boundary 40 in the second image 36, and a left-away boundary portion detector 42 for determining a left-away boundary portion 44 of the second image 36 along the foreground/background boundary 40. A projector 46 is provided to project the second image 36 without the background left-away portion 44 into the first view to obtain a projected version 48 of the second image having a disoccluded area 50 due to the projection. An inserter 52 is responsive to the location of the disoccluded area 50 within the projected version 48 of the second image, to insert the second image along with a portion of the first image 34, depending on a location of the disoccluded area within the projected version of the second image, into the multiview data signal 32.

In particular, the multi-view data signal extraction apparatus 30 may comprise a determiner 54 for determining the portion of the first image 34 to be inserted into the multiview data signal 32 from the location of the disoccluded area 50 within the projected version 48 of the second image. That is, the determiner 54 may determine the portion of the first image 34 to be inserted into the multiview data signal 32 as an area of the first image 34 over which the disoccluded area 50 within the projected version of the second image extends, or which is occupied by area 50, respectively.

The projector 46 may be configured to project the second image 36 without the left-away boundary portion 44 also into a third view not shown in FIG. 1c but being selected such that the second view lies between the first and third views. By this way, a further projected version of the second image having a disoccluded area would be obtained, and the inserter 52 could be configured to insert the second image 36, the portion of the first image 34 and a portion of the third image, also depending on the location of the disoccluded area within the further projected version of the second image, into the multiview data signal 32.

The inserter may also be configured to insert a layer information such as in form of side information into the multi-view data signal 32, the layer information discriminating, at least, a non-boundary portion 56 and the left-away boundary portion 44 of the second image 36.

Further, optionally, a stage 58 for filling small holes resulting in the projection 48 from the projection of the second image and/or filtering of the projected version 48 of the second image may be effectively connected between projector 46 and inserter 52.

The inserter 52 may be configured to discard a remaining portion of the first image 34 disjoint from the portion selected by, for example, determiner 54 depending on the location of the disoccluded area 50 within the projected version 48 of the second image and to signal the discarding in the multi-view data signal 32 such as, for example, by setting the respective pixel values to a default value.

The detector 38 may be configured to detect the foreground/background boundary 40 by use of an edge detector for detecting an edge in the depth information, similarly to the one mentioned above as part of the foreground/background boundary detector 18. The detector 48, in turn, may be configured to split an n-sample-wide area around the edge into a foreground boundary portion and a background boundary portion, with the background boundary portion defining the above-mentioned left-away portion 44. The foreground portion is not of interest here, and is, thus, not shown in FIG. 1c. Thus, detector 48 acts similar to sub-divider 20 of FIG. 1b, and accordingly, the splitting may be done by comparing a depth of the depth information at a sample of the n-sample-wide area with a threshold to decide as to whether the sample belongs to the foreground boundary portion or the background boundary portion, and the threshold value may be, in turn, derived by computing a central tendency of depth values of the depth information at samples of the n-sample-wide area neighboring the sample or the like as described above. In further correspondence to FIG. 1b, projector 48 may be configured to perform the respective projection into the first view by projecting samples from 2D to 3D by use of the associated depth information to obtain 3D world points and projecting the 3D world points into the intermediate view. In particular, the projector 46 may be configured to compute a projecting matrix by interpolating between projecting matrices of the first view and the second view and perform the projection of the 3D world points by use of the projection matrix. Generally, the projector 46 may be configured to perform the respective projection into the intermediate view by two-dimensionally shifting the sample positions at an amount depending on a deviation of the second view from the first view.

The Multi-view data signal 32 obtained by apparatus 30, generally, comprises data about the first image 34 corresponding to the first view and the second image 36 corresponding to the second view being different from the first view, the first and second images 34 and 36 comprising depth information D1 and D2. However, merely a portion of the first image 34 is included in the multi-view data signal 32 while the disjoint portion thereof is discarded in the multi-view data signal 32. The portion included depends on the location of the disoccluded area 50 within the projected version 48 of the second image 36 resulting from projecting the second image 36 without a left-away boundary portion 44 extending along a foreground/background boundary 40 in the second image 36, into the first view. This multi-view data signal 32 into which merely the just-mentioned portion of the first image 34 is inserted may be the part of the first image 14 mentioned above with respect to FIGS. 1*a* and 1*b*, with which the projected version of the second image is merged.

Figure 2:
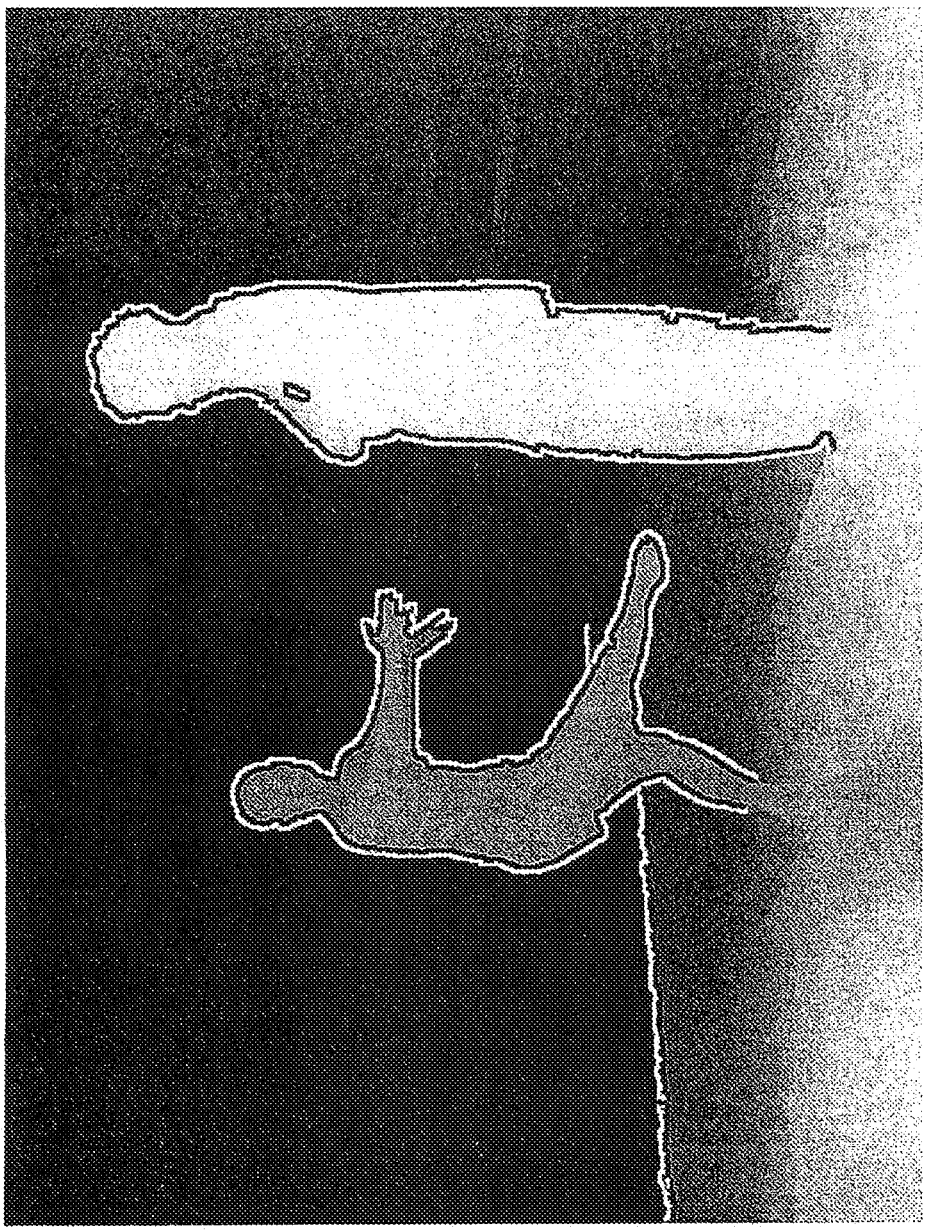
FIG. 2 shows a layer assignment of an illustrative image into a foreground boundary portion (black), background boundary portion (white) and non-boundary region (gray values) according to an embodiment of the present invention.

The solution for advanced 3DV systems presented in the following is an extension and combination to MVD as described in the introductory portion of the specification. In the example in FIG. 20 which shows an advanced 3DTV concept based on MVD (Pos: viewpoint, R: right eye, L: left eye, V: view/image, D: depth), only a subset of M=3 views is transmitted to the receiver. For these views serving as an illustration, sample-accurate depth maps should be generated at the sender side and conveyed together with the video signal. In this scenario, each depth value is assigned to each sample of the original video. Depth maps are often treated as grey scale images as illustrated in FIG. 2. All other views to be displayed are generated by DIBR at the receiver.

The design of such a 3DV system based on the MVD format includes a number of difficult and partially unresolved issues that still necessitate research. This includes multiview capture, depth estimation/generation, parameterization of the system (like number of input views), efficient compression of the depth data, transmission and rendering. In the following embodiment, target receiver side rendering is explained according to an embodiment.

The 3DV concept presented in the introductory portion relies on the availability of high quality intermediate view interpolation algorithms at the receiver. Interpolation artifacts may result in unacceptable quality. In the example in FIG. 20 for instance from position 2 only virtual views are visible. A typical camera distance in a stereo setup is 5 cm. This means that original views V1 and V5 span 20 cm, a distance that is difficult to handle with DIBR. Severe artifacts are known to occur especially along object borders with large depth discontinuities. On the other hand areas with smooth depth variations can be projected very reliably to virtual intermediate views. This implies separate processing of depth discontinuities and smooth depth regions. Depth discontinuities can be found easily within the depth images using edge detection algorithms.

Hence, the interpolation process presented in the following consists of three parts: Layer Extraction (edge detection and separation into reliable and boundary regions), Layer Projection (separate DIBR of regions and fusion) and Hole Filling & Filtering (correction, cleanup and filtering). The idea to work with a layered approached was already investigated in [30] for the application of free viewpoint navigation, where a boundary layer of a certain width along significant depth discontinuities was extracted. In the following approach, this idea is further improved. Moreover, while the approach in [30] operates with simple geometric primitives (triangles) for rendering, the following embodiment purely works with image-based 3D warping. Thus, no 3D graphics support and geometric modeling is necessitated. On the downside, some projection artifacts are introduced, which may be removed, as described in the following.

In other words, in the following a system for video on multiscopic 3D displays is presented in the following where the data representation consists of multiview video plus scene depth. At most, 3 multiview video signals are being transmitted and used together with the depth data to generate intermediate views at the receiver. An approach to such an intermediate view interpolation is presented that separates unreliable image regions along depth discontinuities from reliable image regions. These image regions are processed with different algorithms and then fused to obtain the final interpolated view. In contrast to previous layered approaches, two boundary layers and one reliable layer is used. Moreover, the presented technique does not rely on 3D graphics support but uses image-based 3D warping instead. For enhanced quality intermediate view generation, hole-filling and filtering methods are described. As a result, high quality intermediate views for an existing 9-view auto-stereoscopic display are presented, which prove the suitability of the approach for advanced 3D video (3DV) systems.

In the first part of the rendering approach, the layer extraction, reliable and unreliable depth regions in the original views are distinguished. In principle, the layer extraction corresponds to the functions of modules 18 and 20 in FIG. 1*b*. The areas along object boundaries are considered unreliable, since boundary samples usually have mixed foreground/background colors and can create artifacts after projection into novel views. Further, errors from depth estimation mainly distort object boundaries. Therefore, similar to [30], significant depth discontinuities are detected to create main and boundary layers. For this, a Canny edge detector [2] operating on the depth images and mark a 7-sample-wide area as unreliable along the detected edges may be used. In contrast to [30], this area is split into a foreground and background boundary layer, as shown in FIG. 2 as black and white areas respectively to allow different processing, as shown in the next subsection. In other words, FIG. 2 shows a layer assignment along significant depth discontinuities: foreground boundary layer (black), background boundary layer (white) and main layer (grey values).

This second part, the layer projection, is the main block of the view interpolation algorithm and corresponds to the functionality of stages 22 and 24 of FIG. 1*b* Inputs are a left and a right original image, associated depth maps, associated camera calibration information, and associated label information as shown in FIG. 2. Differently labeled regions from both input images are projected to the virtual view position separately and the results are fused following reliability criteria.

The intermediate view projection is classical image-based 3D warping: First, samples of original 2D views are projected into the 3D space, using associated depth values and camera calibration information. Second, the resulting 3D world points are forward projected into the intermediate view to be generated. The projection matrix for the second step, which is defining the virtual view position, is interpolated from the matrices of the two original views involved, using a position dependent parameter $\lambda \in [0 \ldots 1]$, where $\lambda=0.5$ for instance defines the middle position. This is done with spherical linear interpolation [24] for any position on a linear path between the original cameras.

Figure 3:
FIG. 3 shows an intermediate view resulting from protecting and merging two non-boundary regions of two different views according to an embodiment.

Following this approach, both main layers (i.e. the "non-boundary portion" according to the wording used with respect to FIG. 1*a-c*) are projected into separate color buffers $l_1$ and $l_2$ with corresponding floating-point depth data $d_1$ and $d_2$ from which a common main layer $l_c$ is created as follows:

$$l_c = \begin{cases} \lambda l_2 + (1-\lambda)l_1, & \text{if } d_1 \text{ and } d_2 \text{ exist and } |d_1 - d_2| < \varepsilon \\ l_2, & \text{if } d_1 \text{ does not exist or } d_2 > d_1 + \varepsilon \\ l_1, & \text{if } d_2 \text{ does not exist or } d_1 > d_2 + \varepsilon, \end{cases} \quad (1)$$

where $\lambda$ represents the position dependent parameter mentioned above and $\varepsilon$ a significance value, which was set to 1.0 for the experiments. This method guarantees that either the front-most sample from each view is used, or both samples are $\lambda$-interpolated, if they have similar depth values. The interpolation further reduces possible illumination differences between the original views and provides smooth transition when navigating from one original camera view to the other. A resulting common main layer after projection is shown in FIG. 3. The interpolation process from (1) also creates a common floating-point depth buffer.

In the next step, the foreground boundary layers, that is the "foreground boundary portions" in the wording of FIG. 1a-c, are projected and a common layer for color and floating-point depth is created similar to the main-layer-method, described above. Then, the common main and foreground boundary layer are merged. Here a simple depth test is used: The frontmost sample from either layer is taken, which is mostly the foreground boundary sample. Until now, the functionality corresponded to the function of stage 22.

In the last step of the projection process, the background boundary layers, that is the background portion of FIG. 1a-c, are projected. This information is only used to fill remaining holes in the intermediate view. This corresponds to the function of stage 24 in FIG. 10. Since the common main layer already covers most of the samples around foreground objects, as can be seen in FIG. 3, only few background boundary samples are used and thus the color-distorted samples at object boundaries from the original views are omitted. Those are known to create corona-like artifacts within background regions using simple 3D warping algorithms, which is avoided by the layered approach with 2 different kinds of boundary layers.

Figure 4:
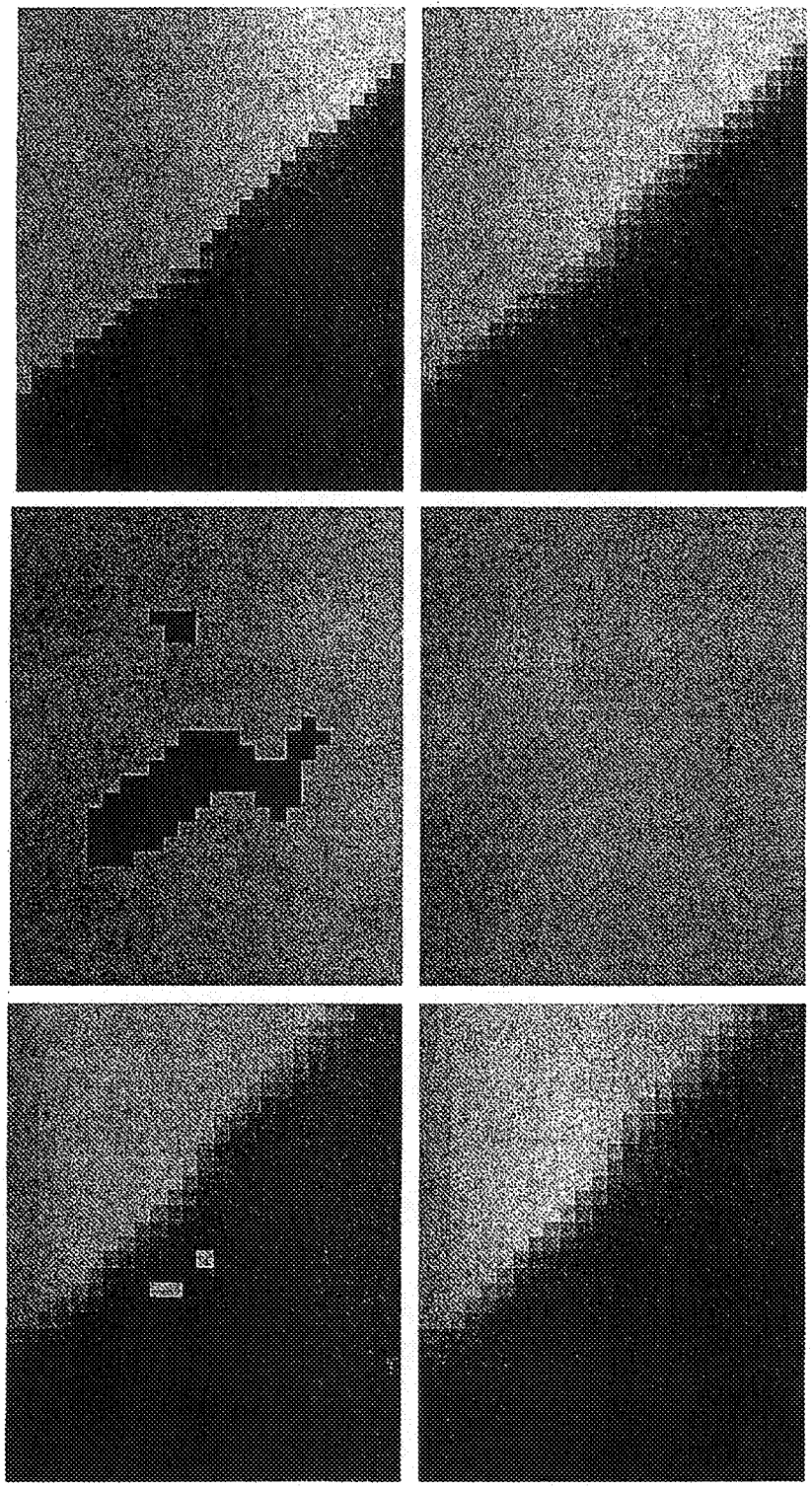
FIG. 4 shows different artifacts (from left to right) occurring after the projecting-and-filling step using the background boundary portion and their appearance after removal thereof by filtering and/or hole-filling according to an embodiment.

The last part of the algorithm, the hole filling & filtering, is a correction, cleanup and filtering process. It corresponds to the functionality of the enhancer 28 in FIG. 1b. Two types of holes may still occur in the rendered images at this stage: small cracks and larger missing areas. The first type of holes is small cracks, which can occur in the entire image area and are introduced by the forward mapping nature of image-based 3D warping. Each point from an original image is projected separately into the intermediate view, and falls in general onto a floating point coordinate. This position is quantized to the nearest neighbor position of the integer sample raster. Unfortunately, quantization may leave some samples unfilled being visible as thin black lines in FIG. 3. In some cases such cracks in foreground regions are filled by background information from the other original image. This results in artifacts as shown in FIG. 4, left, where background samples shine through the foreground object. In FIG. 4, the top line shows different artifacts while the bottom line shows the same portion after artifact removal, in particular, crack sample removal (Left), area filling (Middle) and edge smoothing (Right).

Such artifacts are detected by finding depth values that are significantly different from its two neighboring values in horizontal, vertical, or diagonal directions. Then, they are filled median filtering, i.e. by calculating the median value of neighboring color values assuming that they have correct depth values assigned. The correction of such an artifact is also shown in FIG. 4, left.

The second type of holes includes larger missing areas. They either occur due to erroneous depth values, or are areas that become visible in the intermediate view, while being occluded in both original views. Such larger holes are filled with neighboring available background information, as shown in FIG. 4, middle. Here, corresponding depth values along the hole boundary are analyzed to find background color samples to be extrapolated into the hole region. While this approach leads to good filling results for missing areas due to depth errors, fillings for disocclusions are sometimes incorrectly taken from foreground information and thus exhibit wrong colors.

Finally, foreground objects are low-pass filtered along the edges to provide a natural appearance, as shown in FIG. 4, right. In the original views, object boundary samples are a color mixture of foreground-background due to initial sampling and filtering during image capturing. In the rendered intermediate views of our layered approach, these mixed color samples are often excluded, in order to avoid corona artifacts in the background. Consequently, some foreground-background boundaries look unnaturally sharp, as if foreground objects are artificially inserted into the scene. Therefore, the above-mentioned Canny edge detection filter is applied to the final depth information to identify edges and an averaging low-pass filter is applied to the corresponding color samples to provide a more natural appearance. Additionally, the filtering helps to reduce remaining artifacts along depth discontinuities.

Figure 5:
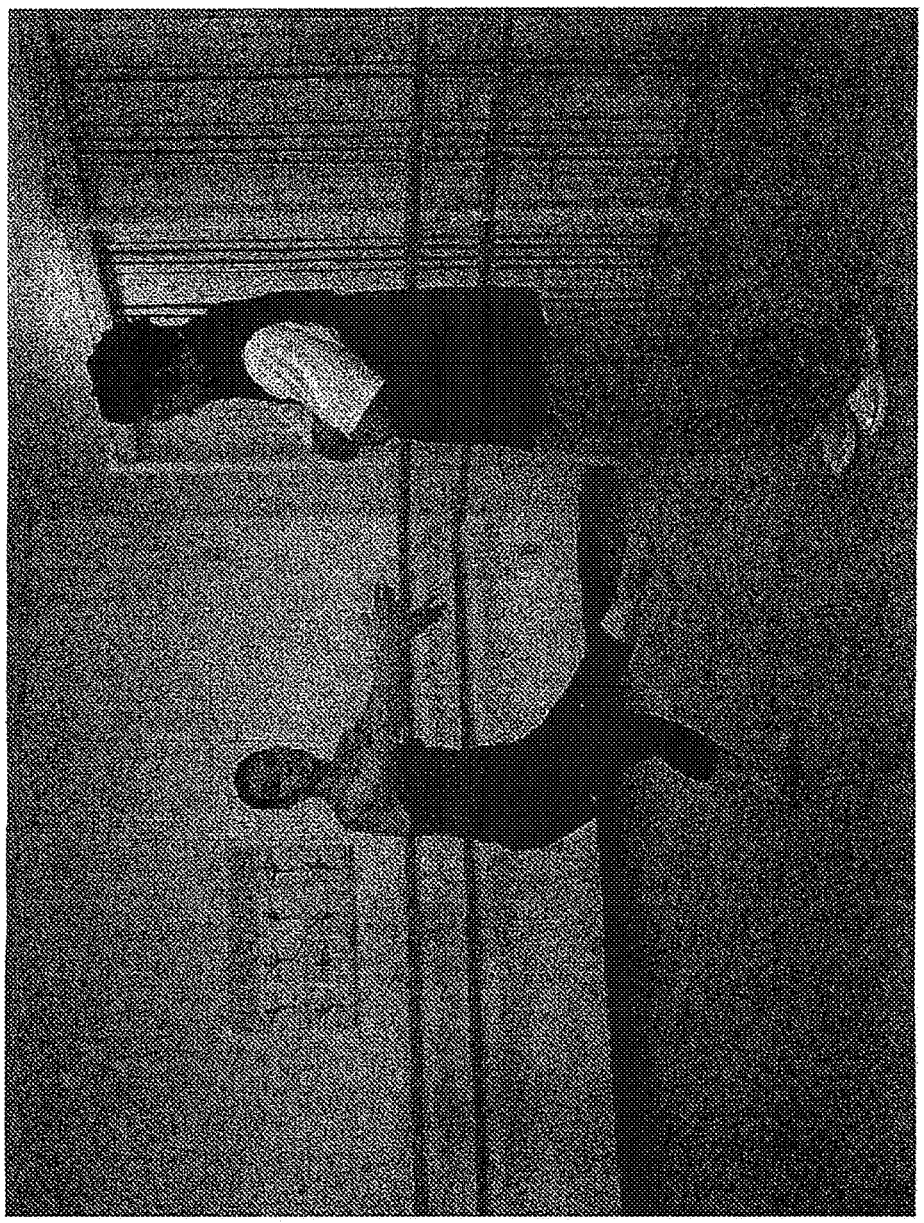
FIG. 5 shows an intermediate view image after artifact removal according to an embodiment.

A resulting intermediate view after all processing steps is shown in FIG. 5 which, thus, shows a final intermediate view interpolation after filtering and is an example for intermediate view image 12 in FIG. 1b. Here, the middle view between two original cameras was synthesized, i.e. $\lambda=0.5$, which corresponds to a physical distance of 10 cm to both original cameras in this case. The virtual view is of excellent quality without visible artifacts.

Figure 6:
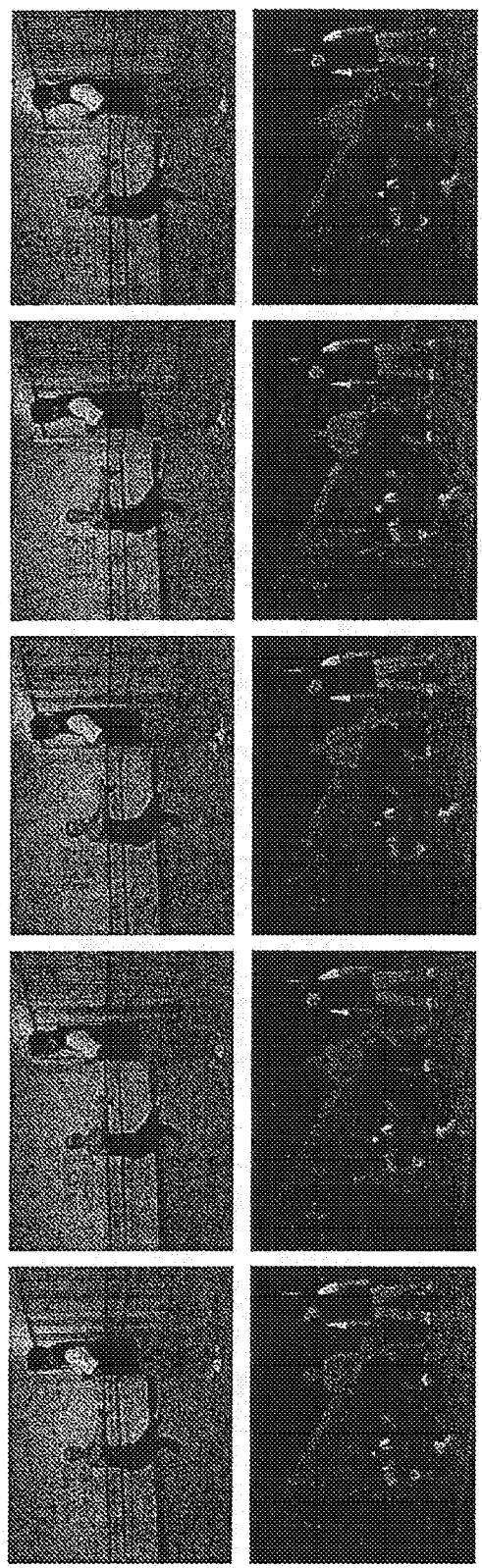
FIG. 6 shows five views in stereo pair distance for 9-view auto-stereoscopic displays, namely two views at original camera position (far left and far right) and intermediate views for Ballet (top) and breakdancers sequence (bottom) according to an embodiment.
Figure 20:
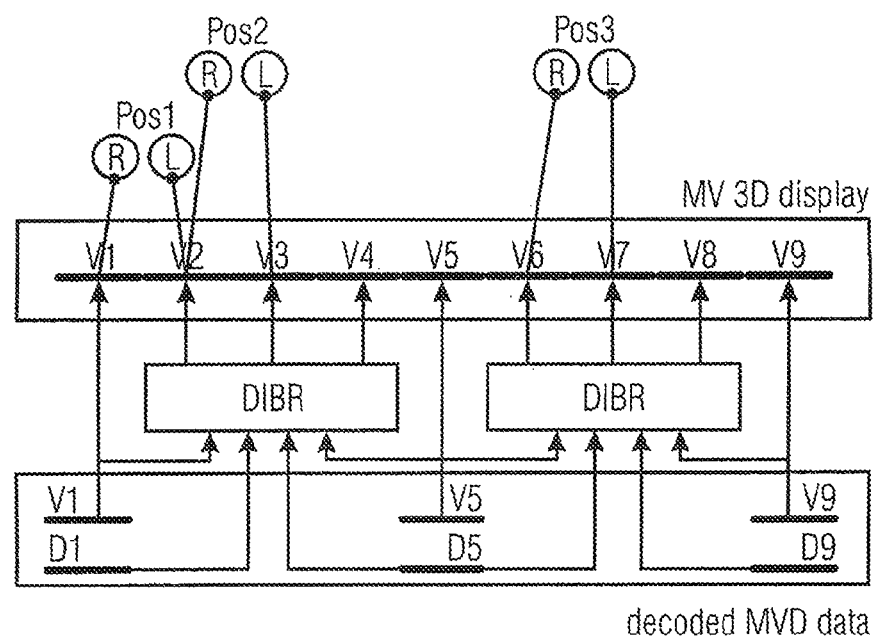
FIG. 20 shows a schematic diagram illustrating an advanced 3DTV concept based on MVD.

The purpose of the view interpolator is to create N input views for a 3DV system out of M views plus depth of an MVD representation. One example is the Philips auto-stereoscopic display, where 9 views with eye-distance (approximately 5 cm) are necessitated as input. For such a setup as illustrated in FIG. 20, five of the resulting nine views are shown in FIG. 6 for the Ballet and Breakdancers data set. The camera spacing of these data sets is 20 cm. Three intermediate views with $\lambda=\{\frac{1}{4}, \frac{1}{2}, \frac{3}{4}\}$ have been created between two original cameras. The leftmost and rightmost images in FIG. 6 are original views. The three images in between are virtual views not exhibiting any artifacts. Pair wise stereoscopic views are available to support motion parallax and 3D depth impression. In other words, FIG. 6 shows five views in stereo pair distance for 9-view auto-stereoscopic display: Two views at original camera positions (far Left and far Right) and intermediate views for Ballet (Top) and Breakdancers sequence (Bottom).

Summarizing the above embodiment, there is described a concept for advanced 3D video (3DV) systems that is based on a multiview plus depth (MVD) representation. It has clear advantages over alternative concepts based on MVC or MPEG-C Part 3 in terms of data rate, quality and functionality. Among others, availability of high-quality intermediate view interpolation algorithms is a crucial prejudice to make this concept feasible. A suitable approach was presented above that minimizes artifacts in the rendered views. It is purely based on image-based 3D warping and does not require 3D graphics support. This just described embodiment introduces separate foreground and background boundary layers for unreliable image areas along depth discontinuities.

Boundary and reliable layers are processed separately and the output is fused following reliability criteria. Furthermore, hole filling algorithms have been implemented to generate missing color information in the intermediate views. A final low-pass filtering of color samples along significant depth discontinuities may provide a more natural appearance and reduces remaining artifacts along edges. The view interpolation may be controlled by a position-dependent parameter, which reduces influence from illumination differences between original views. With that, high-quality intermediate view rendering as needed for the 3DV concept based on MVD has been demonstrated.

The following portion describes a second embodiment of the present invention which is, compared to the first embodiment described in more detail. Again, this embodiment focuses on the growing interest in 3D video applications and systems which is growing rapidly while technology is maturating. It is expected that multiview autostereoscopic displays will play an important role in home user environments, since they support multi-user 3D sensation and motion parallax impression. The tremendous data rate can not be handled efficiently by representation and coding formats such as MVC or MPEG-C Part 3. Multiview video plus depth is a new format that efficiently supports such advanced 3DV systems, but this necessitates high quality intermediate view synthesis. For this, the approach presented below separates unreliable image regions along depth discontinuities from reliable image regions, which are treated separately and fused to the final interpolated view. In contrast to previous layered approaches, the following algorithm uses two boundary layers and one reliable layer, performs image-based 3D warping only and doesn't rely on 3D graphics support. Furthermore, different hole-filling and filtering methods are added to provide high-quality intermediate views. As a result, high quality intermediate views for an existing 9-view auto-stereoscopic display are presented, which prove the suitability of the approach for advanced 3DV systems. The concept relies on high quality intermediate view synthesis algorithms. A general formulation of such DIBR or 3D warping is given below. DIBR is known to produce noticeable artifacts that especially occur along object boundaries with depth discontinuities. The following embodiment, therefore, introduces a novel DIBR algorithm where depth discontinuities are treated in a layered approach with image regions marked as reliable and unreliable areas. Results and improvements over standard 3D warping are presented then. Finally, the second embodiment is summarized.

First, the depth-based intermediate view synthesis is formulated. Within the 3DV framework we assume given input data in the form of color data $l_k$, depth data $d_k$ and camera parameters for each original view k. This data may be provided by a capturing process for $l_k$ and an associated depth camera or depth estimation process for $d_k$. As an example, the original views for the advanced 3DTV concept are shown in FIG. 20 bottom for $k \in \{1, 5, 9\}$. Camera parameters for each original view k are given in the form of intrinsic parameters (focal length, sensor scaling, principle point) in the intrinsic matrix $K_k$ and extrinsic parameters (rotation, translation) in the extrinsic Matrix $[R_k|t_k]$ with rotation matrix $R_k$ and translation vector $t_k$. They can be obtained by classical camera calibration algorithms [27], [6], [9]. Usually, extrinsic and intrinsic Matrix are multiplied to obtain the projection matrix $P_k=K_k[R_k|t_k]$, which projects 3D world points into the image plane of original camera view k. Thus, an original view is given by:

$$l_k(u_k, v_k)$$

$$d_k(u_k, v_k)$$

$$P_k \qquad (1)$$

at each pixel position $(u_k, v_k)$.

The given framework provides a number of sparse original cameras, in the form of (1). The task of view synthesis is to provide dense intermediate views between any pair of adjacent original cameras. For the mathematic derivation of this interpolation process, two original views k and n are given according to (1). For an arbitrary virtual view position between the two cameras, an interpolation parameter $\lambda \in [0 \ldots 1]$ is introduced, where $\lambda=0$ refers to the first original viewing position, $\lambda=1$ to the second and $\lambda=0.5$ for instance defines the middle position. For the intermediate view $l_\lambda(u_\lambda, v_\lambda)$, the associated intrinsic and extrinsic matrices are calculated first:

$$K_\lambda = (1-\lambda)K_k + \lambda K_n$$

$$t_\lambda = (1-\lambda)t_k + \lambda t_n.$$

$$R_\lambda = slerp(R_k, R_n, \lambda) \qquad (2)$$

Here, all parameters are linearly interpolated, except the parameters in the rotation matrix, where spherical linear interpolation [24] is used to preserve the matrix orthonormality. For this, the column vectors of both matrices $R_k$ and $R_n$ are interpolated separately to obtain the column vectors of $R_\lambda$. This calculation is shown exemplary for the first column vector $R_\lambda(i,1)$ of matrix $R_\lambda$:

$$R_\lambda(i, 1) = slerp(R_k(i, 1), R_n(i, 1), \lambda) = \qquad (3)$$
$$\frac{\sin((1 - \lambda)\alpha_i)R_k(i, 1) + \sin(\lambda\alpha_i)R_n(i, 1)}{\sin(\alpha_i)}$$

with $\alpha_i = \arccos(R_k(i, 1) \cdot R_n(i, 1))$.

For $\alpha_i \to 0$ the associated column vectors are in parallel and the spherical linear interpolation simplifies to an ordinary linear interpolation. The other two column vectors are calculated accordingly. From the interpolated intrinsic and extrinsic matrix, the intermediate view projection matrix is calculated accordingly: $P_\lambda = K_\lambda [R_\lambda|t_\lambda]$. Other methods calculate intermediate view projections from three independent original views based on tensor spaces [1] and disparity scaling [5], [19], [23], [3] to address pixel positions in intermediate views. For the interpolation, all color values from both original camera views $l_k(u_k, v_k)$ and $l_n(u_n, v_n)$ are projected into the intermediate view by projecting their associated pixel positions.

The following considerations are carried out for view k only, since the calculations are similar for view n: For view k, the associated pixel position $(u_k, v_k)$ is projected into 3D space first, using the inverse projection matrix $P_k^{-1}$. This projection is ambiguous, since a single 2D pixel point from the camera plane is projected onto the straight line through the camera focal point and pixel position point. Therefore the depth data $d_k(u_k, v_k)$ is necessitated to determine the exact 3D position. Often, depth data is provided in scaled and quantized form, such that the true values $z_k(u_k, v_k)$ need to be obtained first. A typical scaling is inverse depth scaling with the following function [10]:

$$z_k(u_k, v_k) = \frac{1}{d_k(u_k, v_k) \cdot \left(\frac{1}{z_{k,near}} - \frac{1}{z_{k,far}}\right) + \frac{1}{z_{k,far}}}, \quad (4)$$

where the depth data $d_k(u_k, v_k)$ was originally normalized to the range [0 ... 1] and $z_{k,near}$ and $z_{k,far}$ are the minimum and maximum depth values of the 3D scene respectively.

In the next step, the 3D point is forward projected into the intermediate view. Combining both projections, the point-to-point homography can be written as follows:

$$\begin{pmatrix} u_\lambda \\ v_\lambda \\ z_\lambda(u_\lambda, v_\lambda) \end{pmatrix} = P_\lambda P_k^{-1} \begin{pmatrix} u_k \\ v_k \\ z_k(u_k, v_k) \end{pmatrix}. \quad (5)$$

Note that this notation differs from the general plane-to-plane homography formulation, since the depth values $z_k$ and $z_\lambda$ are maintained in (5) for one-to-one mapping between 2D image plane and 3D world coordinates. This mapping is carried out for all pixel positions $(u_k, v_k)$ from view k. For obtaining the color value at a certain position $(u_\lambda, v_\lambda)$ in the intermediate view, all color values $l_k(u_k, v_k)$ from view k that map onto position $(u_\lambda, v_\lambda)$ are collected. Next, the front-most pixel with minimum projected depth $z_{min,\lambda,k}$ is selected:

$$z_{min,\lambda,k}(u_\lambda, v_\lambda) = \quad (6)$$

$$\min_{\forall u_k, v_k} \left\{ z_{\lambda,k,u_k,v_k}(u_\lambda, v_\lambda) \left| \begin{pmatrix} u_\lambda \\ v_\lambda \\ z_\lambda(u_\lambda, v_\lambda) \end{pmatrix} = P_\lambda P_k^{-1} \begin{pmatrix} u_k \\ v_k \\ z_k(u_k, v_k) \end{pmatrix} \right. \right\}.$$

Depending on the 3D scene structure, the number of pixels from view k that map onto position $(u_\lambda, v_\lambda)$ can vary and refer to the following cases:

0 pixel: disocclusion in intermediate view
1 pixel: regular projected content
2 ... N pixel: occlusion.

For the color projection, the associated position $(u_{k,min}, v_{k,min})$ in the original view is necessitated:

$$(u_{k,min}, v_{k,min}) = \quad (7)$$

$$\arg\min_{\forall u_k, v_k} \left\{ z_{\lambda,k,u_k,v_k}(u_\lambda, v_\lambda) \left| \begin{pmatrix} u_\lambda \\ v_\lambda \\ z_\lambda(u_\lambda, v_\lambda) \end{pmatrix} = P_\lambda P_k^{-1} \begin{pmatrix} u_k \\ v_k \\ z_k(u_k, v_k) \end{pmatrix} \right. \right\}.$$

This position finally determines the color contribution $l_{\lambda,k}(u_\lambda, v_\lambda)$ from view k in the intermediate view:

$$l_{\lambda,k}(u_\lambda, v_\lambda) = l_k(u_{k,min}, v_{k,min}). \quad (8)$$

The above process from (5) to (8) is repeated for view n to obtain the color contribution $l_{\lambda,n}(u_\lambda, v_\lambda)$:

$$l_{\lambda,n}(u_\lambda, v_\lambda) = l_n(u_{n,min}, v_{n,min}). \quad (9)$$

Combining the contributions in both views, the general intermediate view interpolation between original views k and n can be formulated:

$$l_\lambda(u_\lambda, v_\lambda) = (1-\lambda) \cdot l_k(u_{k,min}, v_{k,min}) + \lambda \cdot l_n(u_{n,min}, v_{n,min}), \quad (10)$$

where the final color value $l_\lambda(u_\lambda, v_\lambda)$ is interpolated from the two projected color values $l_k(u_{k,min}, v_{k,min})$ and $l_n(u_{n,min},$ $v_{n,min})$ with minimum projected depth values from both views. For real data this general mathematical description needs to be refined to account for incorrect input data, e.g. erroneous depth values, as shown in section 0. In the following implementation of layered intermediate view synthesis, all pixel position indices (u,v) for color and depth data are omitted for simplification, if they don't differ from the general case, shown in this section.

After having specified the general projection process above, which serves as an example for all projections mentioned above with respect to FIG. 1a-c, the adaptation towards real data is described here, i.e. an implementation of layered intermediate view synthesis. The 3DV concept presented just before relies on the availability of high quality intermediate view synthesis algorithms at the receiver. Previous approaches on view synthesis have concentrated on simple concepts without adequate occlusion handling [14], [5], [21], [13] or generate a complex point-based representation [4] However, interpolation artifacts may result in unacceptable quality. In the example in FIG. 20 for instance from position 2 only virtual views are visible. A typical camera distance in a stereo setup is 5 cm. This means that original views V1 and V5 span 20 cm, a distance that is difficult to handle with DIBR. Severe artifacts are known to occur especially along object borders with large depth discontinuities. On the other hand areas with smooth depth variations can be projected very reliably to virtual intermediate views. This implies separate processing of depth discontinuities and smooth depth regions. Depth discontinuities can be found easily within the depth images using edge detection algorithms.

Figure 7:
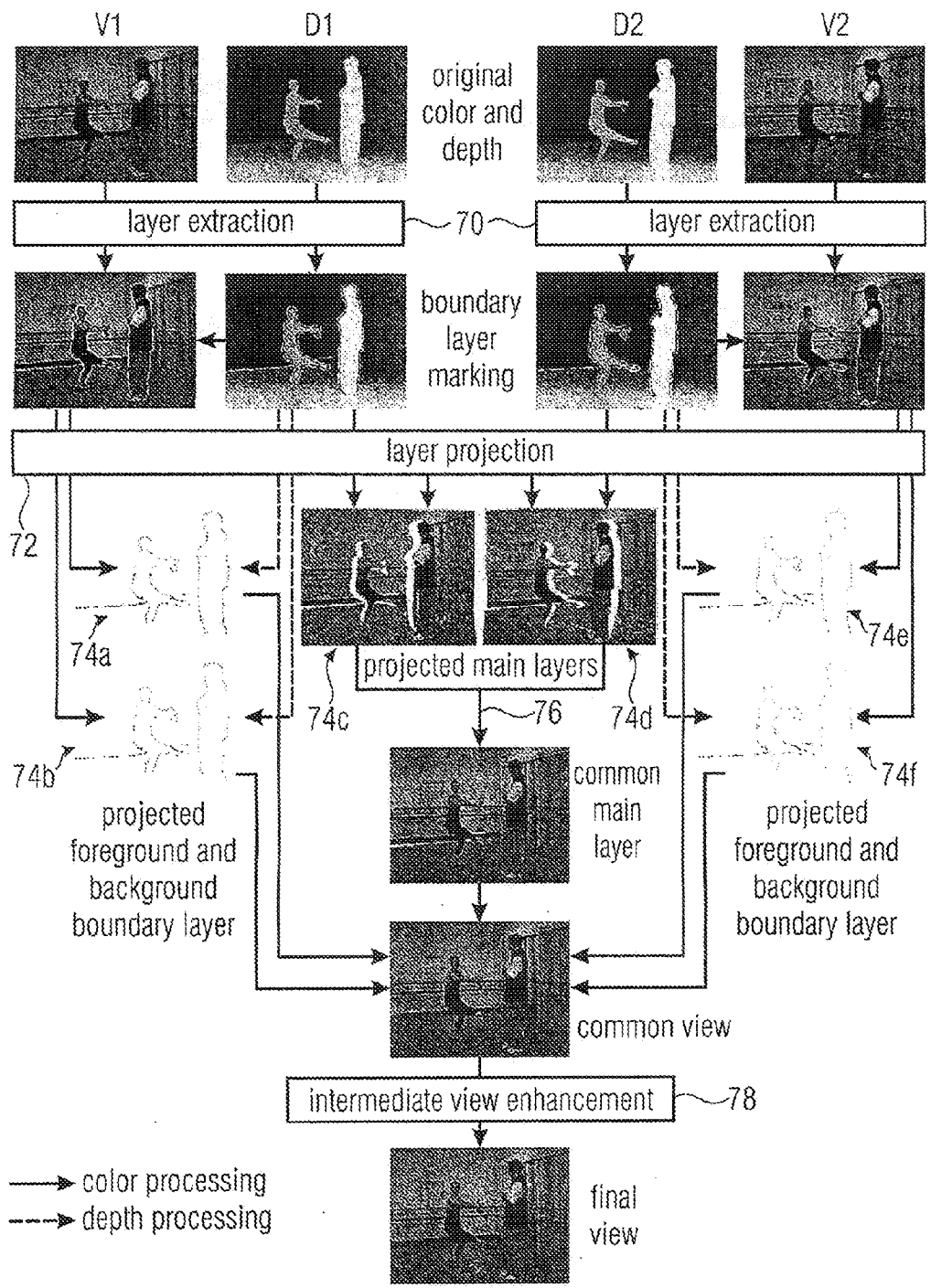
FIG. 7 shows a schematic diagram of a sequence of method steps of an intermediate view synthesis method according to an embodiment.

Hence, the following view synthesis process consists of three parts: Layer Extraction (edge detection and separation into reliable and boundary regions), Layer Projection (separate DIBR of regions and fusion) and Intermediate View Enhancement (correction, cleanup and filtering). An overview of the process is shown in FIG. 7 which thus shows a structural overview of the synthesis method: Input data for our method are original color and per-pixel depth data for two side views marked with V1, V2, D1 and D2 to highlight the correspondence to FIG. 1b. The solid arrows represent color processing, while dashed arrows show depth processing or depth data usage for projection or edge detection purposes. From the depth information, the layers are extracted 70 along the significant depth discontinuities, with this extraction corresponding to the function of blocks 18, 18', 20 and 20' in FIG. 1b. In the next stage in FIG. 7, all layers from the marked color buffers are projected 72 into separate layer buffers 74a-d for the intermediate view. The intermediate view is created by merging 76 the two projected main layers 74c and 74d first. Afterwards, foreground and background boundary layers are added, as described further below. Finally, image enhancement 78, such as hole filling and edge smoothing are applied to create the final intermediate view.

The idea to work with a layered approached was already investigated in [30] for the application of free viewpoint navigation, where a boundary layer of a certain width along significant depth discontinuities was extracted. This approach is further improved here. Moreover, while the approach in [30] operates with simple geometric primitives (triangles) for rendering, the embodiment of FIG. 7 purely works with image-based 3D warping. Thus, no 3D graphics support and geometric modeling is necessitated. On the downside, the approach of FIG. 7 introduces some projection artifacts, which, however, may to be removed, as described further below.

The Layer Extraction 70 corresponds to the function of modules 18, 18', 20, 20'. In this first part of the rendering approach, reliable and unreliable depth regions in the original views are distinguished. The areas along object boundaries are considered unreliable, since boundary samples usually have mixed foreground/background colors and can create artifacts after projection into novel views. Further, errors from depth estimation mainly distort object boundaries. Therefore, similar to [30], significant depth discontinuities are detected to create main and boundary layers. For this a Canny edge detector [2] with a content-adaptive significance threshold (110 in our experiments) operating on the depth images may be used. A 7-sample-wide area may be marked as unreliable along the detected edges. In contrast to [30], this area is split into a foreground and background boundary layer, as shown in FIG. 2 as black and white areas respectively to allow different processing, as shown in the next subsection.

The layer projection 72 corresponds to the functionality of modules 22 and 26 in FIG. 1b. The layer projection 72 extends the general formulation of depth-based intermediate view synthesis, presented above. This second part of the processing chain is an important block of the view synthesis algorithm. Inputs are a left and a right original image, associated depth maps, associated camera calibration information, the interpolation parameter $\lambda \in [0 \ldots 1]$, all presented above, and associated label information as shown in FIG. 2. Differently labeled regions from both input images are projected to the virtual view position separately and the results are fused following depth ordering and reliability criteria.

Figure 8A:
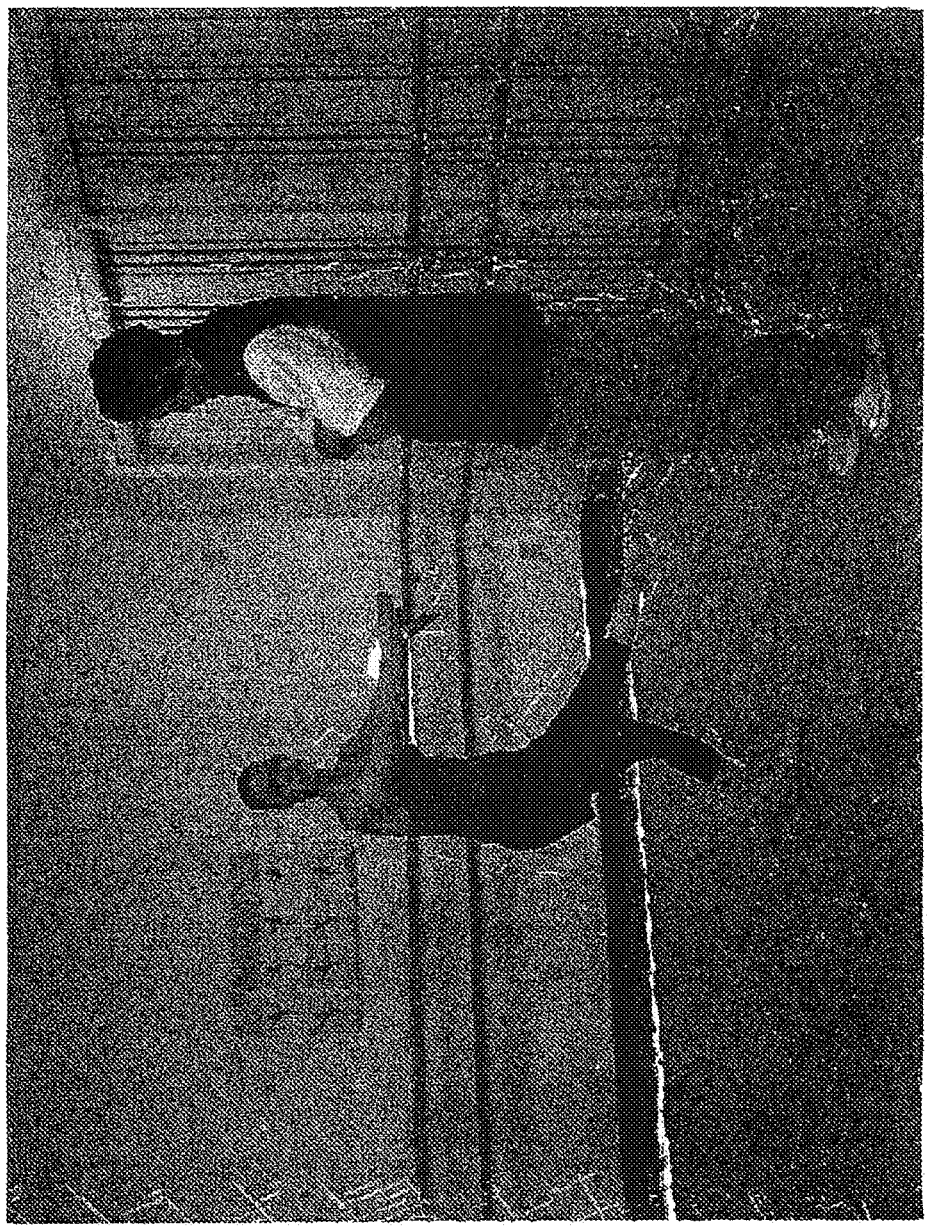
FIGS. 8a and 8b shows an intermediate view resulting from projecting and merging the non-boundary portions of two different views on the one hand, and the subordinate views of the foreground/background boundary region on the other hand, according to an embodiment.

Following the general approach, presented above, both main layers are projected into separate color or color buffers $l_1$ and $l_2$, using the corresponding floating-point real depth data $z_1$ and $z_2$. From this, a common main layer $l_{M,\lambda}$ is created by varying the general interpolation formula (10) as follows:

$$l_{M,\lambda} = \begin{cases} (1-\lambda)l_1 + \lambda l_2, & \text{if } z_{\lambda,1} \text{ and } z_{\lambda,2} \text{ exist and } |z_{\lambda,1} - z_{\lambda,2}| < \varepsilon \\ l_2, & \text{if } z_{\lambda,1} \text{ does not exist or } z_{\lambda,2} > z_{\lambda,1} + \varepsilon \\ l_1, & \text{if } z_{\lambda,2} \text{ does not exist or } z_{\lambda,1} > z_{\lambda,2} + \varepsilon \end{cases} \quad (11)$$

where $\varepsilon$ represents a significance value, which was set to 1.0 for the experiments and $z_{\lambda,1}$ and $z_{\lambda,2}$ represent the projected depth values w.r.t. the intermediate view. These projected depth values are used to decide on the depth ordering of both color values. The method in (11) guarantees that either the front-most sample from each view is used, or both samples are $\lambda$-interpolated, if they have similar projected depth values. The interpolation further reduces possible illumination differences between the original views and provides smooth transition when navigating from one original camera view to the other. A resulting common main layer after projection is shown in FIG. 8a. The interpolation process (11) also creates a common floating-point depth buffer $z_{M,\lambda}$:

$$z_{M,\lambda} = \min(z_{\lambda,1}, z_{\lambda,2}). \quad (12)$$

In the next step, the foreground boundary layers $l_{F,1}$ and $l_{F,2}$ are projected and a common layer for color $l_{F,\lambda}$, and floating-point depth $z_{F,\lambda}$ is created similar to the main-layer-method, described in (12). Then, the common main and foreground boundary layer are merged:

$$l_{FM,\lambda} = \begin{cases} l_{F,\lambda}, & \text{if } z_{F,\lambda} \leq z_{M,\lambda} \\ l_{M,\lambda}, & \text{if } z_{F,\lambda} > z_{M,\lambda} \end{cases}. \quad (13)$$

Here, only a simple depth test is used: The front-most sample from either layer is taken, which is mostly the foreground boundary sample. Besides the new common color layer $l_{FM,\lambda}$, the associated depth layer $z_{FM,\lambda}$ is created similarly to (12). The result corresponds to the output of block 22 in FIG. 1b.

Figure 8B:
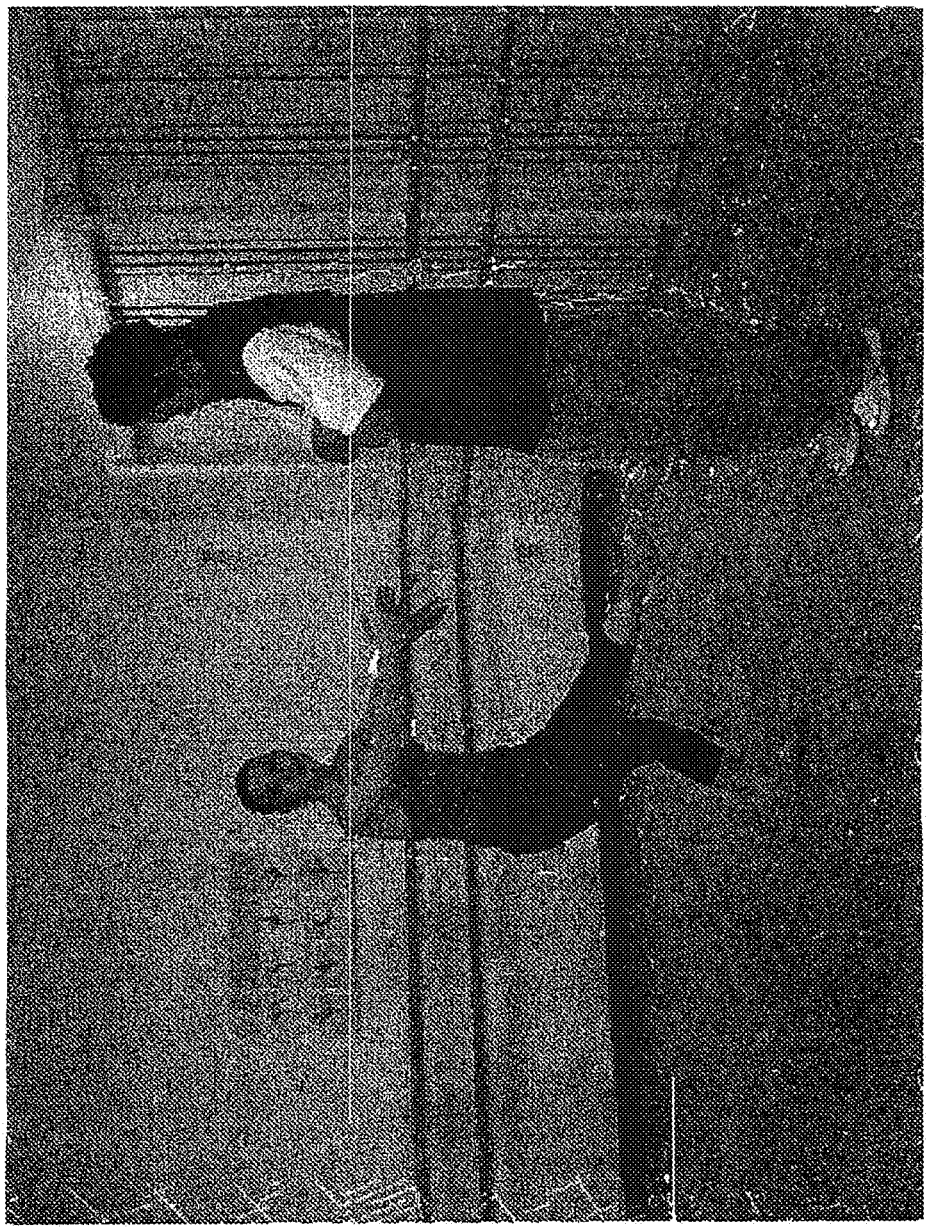

In the last step of the projection process, the background boundary layers $l_{B,1}$ and $l_{B,2}$ are merged to $l_{B,\lambda}$ and projected:

$$l_\lambda = \begin{cases} l_{FM,\lambda}, & \text{if } z_{FM,\lambda} \text{ exists} \\ l_{B,\lambda}, & \text{if } z_{FM,\lambda} \text{ does not exist} \end{cases}, \quad (14)$$

to create the final color or color $l_\lambda$ and depth $z_\lambda$, similar to (12). The background layer information is only used to fill empty regions in the intermediate view. With this step corresponding to block 26 in FIG. 1b. Since the common main layer $l_{FM,\lambda}$ already covers most of the samples around foreground objects, as can be seen in FIG. 8a, only few background boundary samples are used and thus the color-distorted samples at object boundaries from the original views are omitted. Those are known to create corona-like artifacts within background regions using simple 3D warping algorithms, which is avoided by our layered approach with 2 different kinds of boundary layers. The result or intermediate view after layer projection is shown in FIG. 8b.

The Intermediate View Enhancement 78 corresponds to the functionality of module 28 in FIG. 1b. This last part of the algorithm provides post-processing after layer projection and includes correction, cleanup and filtering processes. Two types of holes may still occur in the rendered images at this stage: small cracks and larger missing areas. The first type of holes is small cracks, which can occur in the entire image area and are introduced by the forward mapping nature of image-based 3D warping. Each point from an original image is projected separately into the intermediate view, and falls in general onto a floating point coordinate. This position is quantized to the nearest neighbor position of the integer sample raster. Unfortunately, quantization may leave some samples unfilled being visible as thin black lines in FIG. 8a and FIG. 8b. In some cases such cracks in foreground regions are filled by background information from the other original image. This results in artifacts as shown in FIG. 3, left, where background samples shine through the foreground object.

Such artifacts are detected by finding depth values that are significantly larger than both neighboring values in horizontal, vertical, or diagonal directions:

$$g_{hor} = 2 \cdot z_\lambda(u_\lambda, v_\lambda) - z_\lambda(u_\lambda-1, v_\lambda) - z_\lambda(u_\lambda+1, v_\lambda)$$

$$g_{ver} = 2 \cdot z_\lambda(u_\lambda, v_\lambda) - z_\lambda(u_\lambda, v_\lambda-1) - z_\lambda(u_\lambda, v_\lambda+1)$$

$$g_{diag,1} = 2 \cdot z_\lambda(u_\lambda, v_\lambda) - z_\lambda(u_\lambda-1, v_\lambda-1) - z_\lambda(u_\lambda+1, v_\lambda+1)$$

$$g_{diag,2} = 2 \cdot z_\lambda(u_\lambda, v_\lambda) - z_\lambda(u_\lambda+1, v_\lambda-1) - z_\lambda(u_\lambda-1, v_\lambda+1). \quad (15)$$

This refers to background pixels within a foreground region. From the directional significance values, the maximum value $g_{max}$ is calculated:

$$g_{max} = \max(g_{hor}, g_{ver}, g_{diag,1}, g_{diag,2}). \quad (16)$$

If $g_{max}$ exceeds a specific threshold (40 in our experiments), the color value $l_\lambda(u_\lambda, v_\lambda)$ is substituted by the median value of neighboring color values assuming that they have correct depth values assigned. The correction of such an artifact is also shown in FIG. 3, left.

The second type of holes includes larger missing areas. They either occur due to erroneous depth values, or are areas that become visible in the intermediate view, while being occluded in both original views. Such larger holes are currently filled line-wise with neighboring available background information, as shown in FIG. 3, middle. Here, the two corresponding depth values at the two hole boundary pixel are analyzed to find background color samples to extrapolate into the hole region. This simple constant-color extrapolation of the background pixel leads to better results, than an unconstrained linear interpolation between both values. Often, one of the hole boundary pixels belongs to the foreground object and its color value would lead to color bleeding into the hole. This approach leads to good filling results for missing areas due to depth errors. In cases of fillings for disocclusions, sometimes both hole boundary pixel are foreground pixel and the foreground color is incorrectly extrapolated into the background hole.

Here one of the fundamental problems of view interpolation from sparse views occurs, which are disocclusions in intermediate views, where no original information is available in any view. For this, no general solution exists. In some cases, hole filling algorithms could be extended into the temporal dimension to hope for additional data in previous or future frames, if a foreground object has moved enough to reveal necessitated background information. However, since the degree of motion cannot be predicted, this approach has limitations and was not considered for our implemented method.

Finally, foreground objects are low-pass filtered along the edges to provide a natural appearance, as shown in FIG. 3, right. In the original views, object boundary samples are a color mixture of foreground-background due to initial sampling and filtering during image capturing. In the rendered intermediate views of our layered approach, these mixed color samples are often excluded, in order to avoid corona artifacts in background areas. Consequently, some foreground-background boundaries look unnaturally sharp, as if foreground objects were artificially inserted into the scene. Therefore, the above-mentioned Canny edge detection filter [2] is applied to the final depth information $z_\lambda$ of the intermediate view to detect edges with depth gradients $|\nabla z_\lambda|$ above the Canny significance threshold $\eta$ ($\eta=50$ in our experiments). Then the color buffer is convolved with an averaging three-tap low-pass filter in both spatial directions at corresponding significant depth edges to provide a more natural appearance:

$$l_{\lambda,Final} = \begin{cases} l_\lambda * \frac{1}{9}\begin{pmatrix} 1 & 1 & 1 \\ 1 & 1 & 1 \\ 1 & 1 & 1 \end{pmatrix}, & \text{if } |\nabla z_\lambda| \geq \eta \\ l_\lambda, & \text{if } |\nabla z_\lambda| < \eta \end{cases} \quad (17)$$

Additionally, the filtering helps to reduce remaining artifacts along depth discontinuities.

View synthesis examples are presented next. A resulting intermediate view or final intermediate view synthesis after filtering and all processing steps, respectively, is shown in FIG. 5.

Here, the middle view between two original cameras was synthesized, i.e. $\lambda=0.5$, which corresponds to a physical distance of 10 cm to both original cameras in this case. The virtual view is of excellent quality without visible artifacts.

Figure 9:
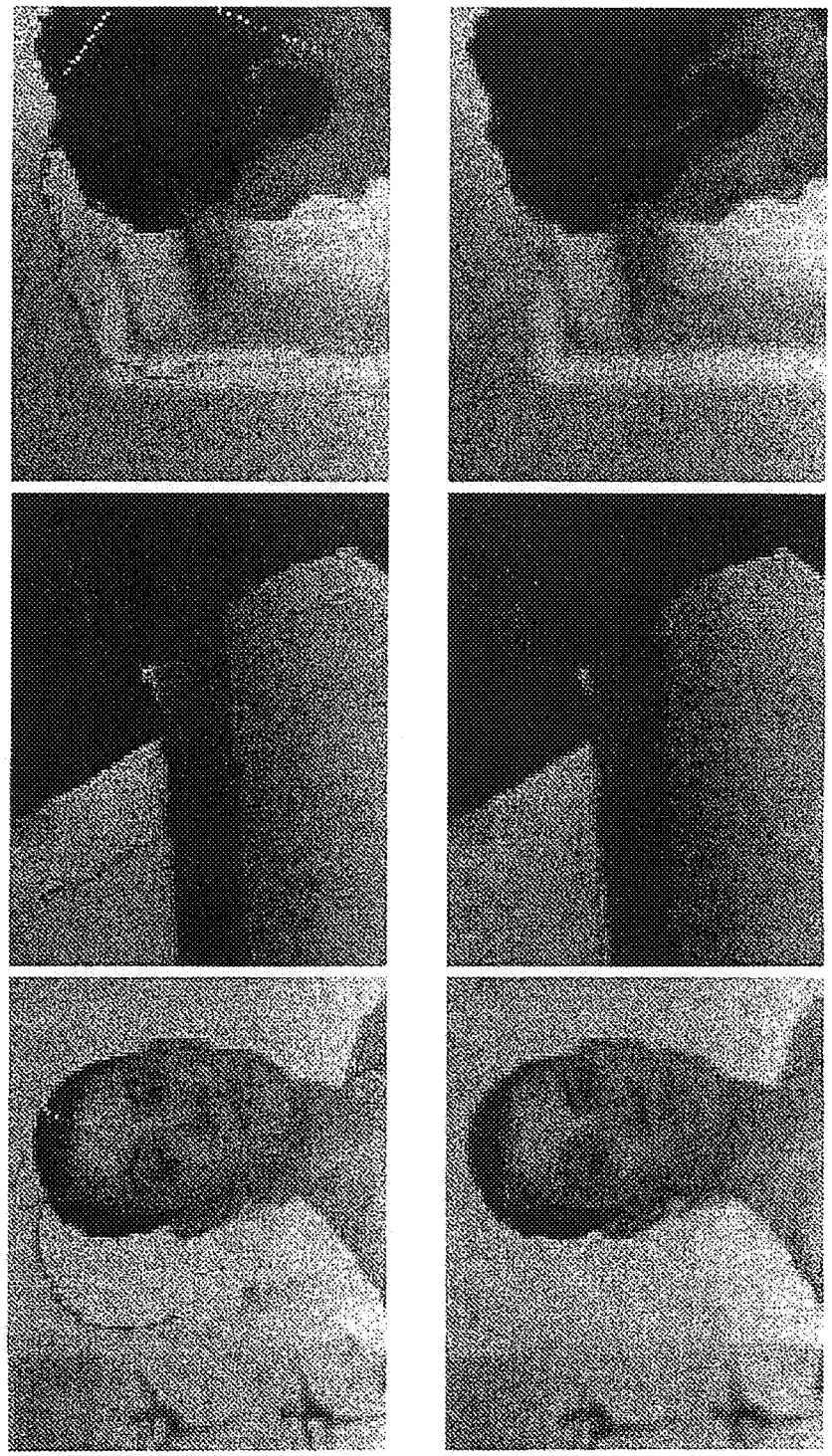
FIG. 9 shows detailed portions of intermediate views resulting from intermediate view synthesis by simple merging on the one hand and intermediate view synthesis according to an embodiment of the present invention on the other hand.

Details of rendered views are shown in FIG. 9 which, thus, shows details in the intermediate view for simple merging and our proposed method. The top row shows examples of standard 3D warping without the specific processing steps introduced in section 0. Corona artifacts occur at foreground/background boundaries. Some dark foreground pixels are mistakenly added to lighter background areas, resulting in typical corona type additional contours around objects. Further, cracks are visible within foreground objects. These cracks were mistakenly left open in the forward mapping process of the foreground and then filled wrongly with background information. Such artifacts are usually not stationary but changing over time, resulting in very annoying effects within the rendered video. This can make the whole concept of 3DV unacceptable. The bottom row in FIG. 9 shows the corresponding rendering details using our improvements to the 3D warping process as introduced in section 0. Corona artifacts and cracks are widely removed. Low-pass filtering along the depth discontinuities further helps to smooth and enhance the general image impression. With minimum artifacts of individual images also the video quality is significantly increased, thus our views synthesis algorithm is capable to form the basis for the advanced 3DV concept based on MVD.

The purpose of the view interpolator is to create N input views for a 3DV system out of M views plus depth of an MVD representation. One example is the Philips auto-stereoscopic display, where 9 views with eye-distance (approximately 5 cm) are necessitated as input. For such a setup as illustrated in FIG. 20, five of the resulting nine views are shown in FIG. 6 for the Ballet and Breakdancers data set. The camera spacing of these data sets is 20 cm. Three intermediate views with $\lambda=\{\frac{1}{4}, \frac{1}{2}, \frac{3}{4}\}$ have been created between two original cameras. The leftmost and rightmost images in FIG. 6 are original views. The three images in between are virtual views not exhibiting any artifacts. Pair wise stereoscopic views are available to support motion parallax and 3D depth impression.

Concluding, an advanced system for 3DV based on MVD is presented above. It efficiently supports multiview stereoscopic displays. This type of 3D displays enables multi-user 3DV sensation in a living room environment without the necessity to wear glasses, but with motion parallax impression and full social interaction. MVD can serve as a generic format for 3DV in this concept as it has clear advantages over alternative concepts based on MVC or MPEG-C Part 3 in terms of data rate, quality and functionality. This concept, however, integrates a number of sophisticated processing steps that partially still necessitated research. Among those, high-quality intermediate view synthesis is crucial to make this concept feasible. It is known that such algorithms may introduce annoying artifacts along depth discontinuities. Therefore the approach presented here separates input images in reliable and unreliable areas based on edge detection in depth images, since these edges correspond to depth discontinuities. Reliable and unreliable image areas are treated separately and the results are merged depending on reliability criteria. Specific post-processing algorithms are introduced to further enhance rendered view quality. This includes different hole-filling approaches as well as a final smoothing filter along depth discontinuities in the rendered views to reduce remaining artifacts. A position-dependent blending factor is used to weight contributions from different input images. The presented results show that the processing in layers taking reliability information along depth discontinuities into account significantly reduces rendering artifacts. Corona artifacts that frequently occur with standard 3D warping are widely eliminated. High quality intermediate views are generated with the presented algorithm. With this, an important building block within the advanced 3DV concept for MVD is shown to be available. Besides further optimization, our future work will include development of all other building blocks such as acquisition, depth estimation, coding, and transmission, as well as the final system integration.

The following portion describes a third embodiment of the present invention. In particular, A system for video rendering on multiscopic 3D displays is considered in the following where the data is represented as layered depth video (LDV). This representation consists of one full or central video with associated per-pixel depth and additional residual layers. Thus, only one full view with additional residual data needs to be transmitted. The LDV data is used at the receiver to generate all intermediate views for the display. The LDV layer extraction as well as the view synthesis, using a scene reliability-driven approach, is presented. Here, unreliable image regions are detected and in contrast to previous approaches the residual data is enlarged to reduce artifacts in unreliable areas during rendering. To provide maximum data coverage, the residual data remains at its original positions and will not be projected towards the central view. The view synthesis process also uses this reliability analysis to provide higher quality intermediate views than previous approaches. As a final result, high quality intermediate views for an existing 9-view auto-stereoscopic display are presented, which prove the suitability of the LDV approach for advanced 3D video (3DV) systems.

As already described in the introductory portion of the specification, increased interest in 3D video has lead to improved technologies for all stages of the 3D processing chain from capturing via format representation and coding to display and rendering. One of the most general approaches for 3D content display, especially for recorded natural scenes, is the simultaneous presentation of image stereo pairs to provide the user with a natural depth impression [17]. To offer restricted user navigation with look-around sensation, this generated stereo pair should vary with the users head motion. For this, multiview autostereoscopic displays are already available, which present a number of views simultaneously (9 views and more in today's displays), while the user sees two stereo views depending on the viewpoint in front of the display.

All views have to be available at the display such that either all of them have to be transmitted, which necessitates huge data rates, or sophisticated methods with view subsampling and intermediate view synthesis are used. One candidate for the latter approach is layered depth video (LDV) which allows reducing the raw data rate for 3DV systems drastically. Only one central view and residual information from a subset M of the N display views are transmitted. Additionally, depth data is transmitted for the central view and residual subset M. The non-transmitted views can be generated by intermediate view interpolation at the receiver given the transmitted data [15].

The origins of LDV come from layered-depth images (LDI), a method that was identified as a general approach for rendering 3D objects with complex scene geometry [33]. In LDIs, each pixel in a camera image can contain multiple pixels with color and depth values along the pixel's line of sight. The generation of LDI was investigated for stereo recording first [33] and later for multi-view settings [32]. A hierarchical LDI approach was also applied to navigations in virtual scenes with progressive view-dependent rendering refinement [31]. When navigating around the original viewpoint, these approaches provide limited occlusion and disocclusion handling, but exhibit still problems for view synthesis in sparse multiview data, namely hole filling and corona artifacts along boundaries between objects of different depth. Therefore, we propose to use a reliability analysis for LDV data creation to reduce such artifacts.

In the following, first the concept for advanced 3DV systems is shown. Then, the layer-based LDV data extraction process with optimized residual representation form is presented. Next, the synthesis process is presented, where a layer-based approach is used again to minimize noticeable artifacts to provide high-quality intermediate views. Lastly, rendering results for a 3DV setting are shown.

Figure 10:
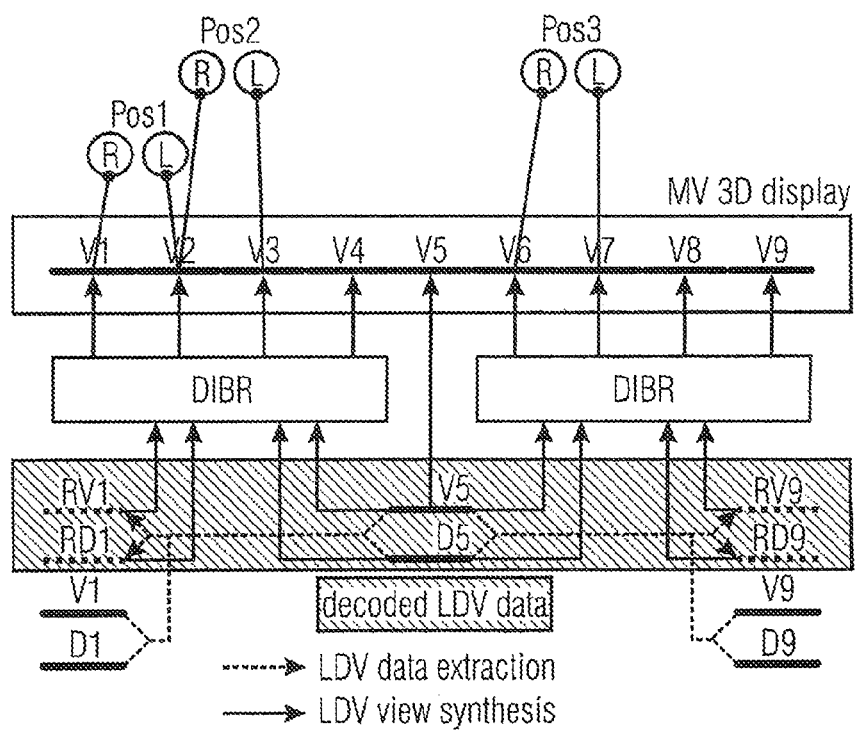
FIG. 10 shows a schematic diagram illustrating an LDV-based 3DTV concept according to an embodiment of the present invention.

Further, as had also already described above, 3DV systems are capable to support head motion parallax viewing by displaying multiple views at the same time. Among many others, one specific example is a high-resolution LCD screen with slanted lenticular lens technology and 9 simultaneous views, commercially available from Philips and as described in "Philips 3D Solutions" May 2006, Koninklijike Philips Electronics N. V. The principle for head motion parallax support with a 3D display is illustrated in FIG. 10. A user at position 1 sees views 1 and 2 with right and left eye respectively only. Another user at position 3 sees views 6 and 7, hence multi-user 3D viewing is supported.

Assume a user moves from position 1 to position 2. Now views 2 and 3 are visible with the right and left eye respectively. If V1 and V2 is a stereo pair with proper human eye distance baseline, then V2 and V3 as well and so on, a user moving in front of such a 3D display system will perceive a 3D impression with dis-occlusions and occlusions of objects in the scenery depending on their depth. This motion parallax impression will not be seamless and the number of different positions is restricted to N−1.

The extended functionality results on the other hand in a tremendous increase of data rate, i.e. N times the bit rate for compressed transmission compared to 2D video, if all views are treated independently. Multiview video coding (MVC) including inter-view prediction typically reduces the overall bit rate by 20% [20], which appears to be too high for most application scenarios.

An efficient approach for stereo video (i.e. 2 views) is to use video plus depth (V+D) as data format [7]. MPEG recently released a corresponding standard known as MPEG-C Part 3. A receiver can reproduce the stereo video from V+D by depth image-based rendering (DIBR) of the second video. It has been shown that in this case the depth data can be compressed very efficiently. The resulting bit rate of V+D is much smaller than the bit rate for the corresponding stereo video, while providing the same visual quality. This concept works well, if only one virtual view which is close to the available view needs to be rendered from the V+D data (e.g. corresponding to V1 and V2 in FIG. 1). Extrapolation artifacts increase with the distance or the virtual view. Therefore V+D is not suitable for 3DV systems with a large number of views.

A more efficient solution in terms of compression potential is multiview+depth (MVD), [34] where only a subset of views with depth would be transmitted and intermediate views synthesized at the receiver side. Another solution that necessitates even less data rate is to use layered depth video (LDV) which is presented here. In LDV, only a central view (V5 in FIG. 10) and associated residual video for side views are transmitted. Thus, FIG. 1 shows an advanced LDV-based 3DTV concept (Pos: viewpoint, R: right eye, L: left eye, V: view/image, D: depth, RV: Residual Video Layer, RD: Residual Depth Layer).

The residual layers are extracted from the side views (V1 and V9). For the central and side views, sample-accurate depth maps should be generated at the sender side and conveyed together with the video signal. From the central view and side views, residual information is generated for color and depth, as described below. All other views to be displayed are generated by DIBR at the receiver. Residual layer extraction and view synthesis for LDV are described in the following.

In multiview applications with N views, intermediate views can be synthesized, using the available information in all views. In a LDV scenario, only one view is available together with some fragments of additional information from other views. In a straight-forward LDV extraction approach, one camera view would be projected into the other views.

Assuming a camera system with 3 linear parallel cameras, the central view is projected into both side views. Then, the difference between the original and projected view would be taken to obtain the residual information, which consists of disoccluded information and is therefore mainly concentrated along depth discontinuities of foreground objects as well as image boundary data in both side views. A following view synthesis stage uses the full information of the central view and depth data plus the residual information. This processing, however leads to corona artifacts in all synthesized intermediate views. To avoid such visible artifacts, our extraction algorithm uses a layered approach, introduced for a full intermediate view synthesis in [30] and refined in [34] for multiview video+depth data. The layers are extracted in the depth buffers and indicate reliable and unreliable data. The latter occurs at depth discontinuities. The layers are extracted using a Canny edge detection filter [2] and mark a 7-pixel wide area along depth discontinuities. This area includes foreground and background boundary information.

Figure 11:
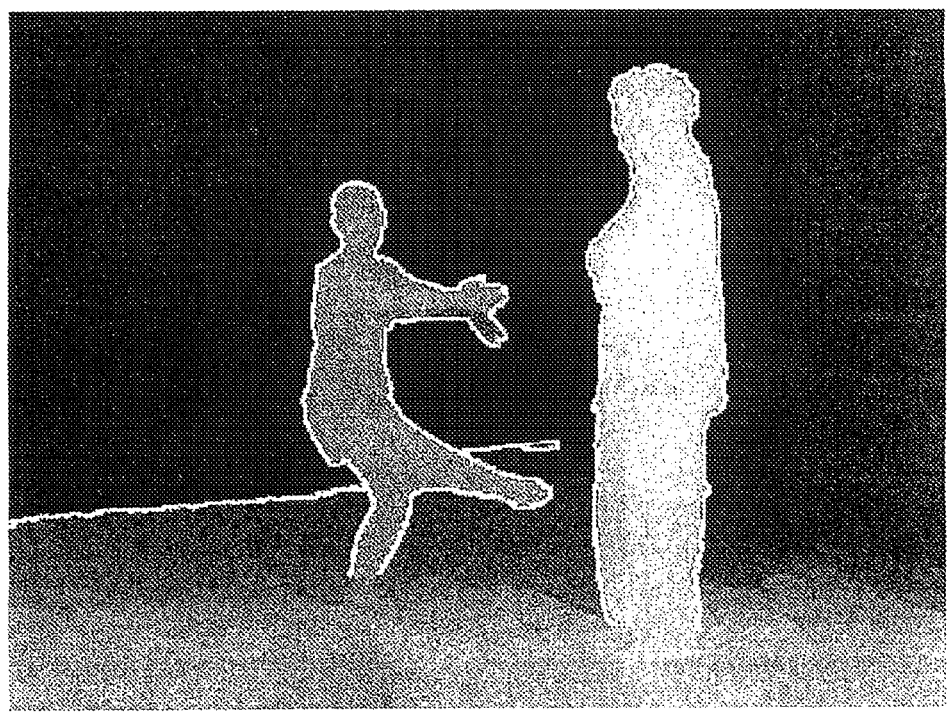
FIG. 11 shows the result of sub-dividing an image into a left-away boundary portion (white) on the one hand and a remaining portion (gray) on the other hand, according to an embodiment.

In contrast to [34], only the background boundary layer is necessitated for LDV, since only a single foreground object remains in the central view and a separate foreground boundary layer is not required for the LDV data extraction. The background boundary layer marking is shown in FIG. 11 in green. Thus, FIG. 11 shows a background layer assignment (white) along significant depth discontinuities in central view.

Figure 12:
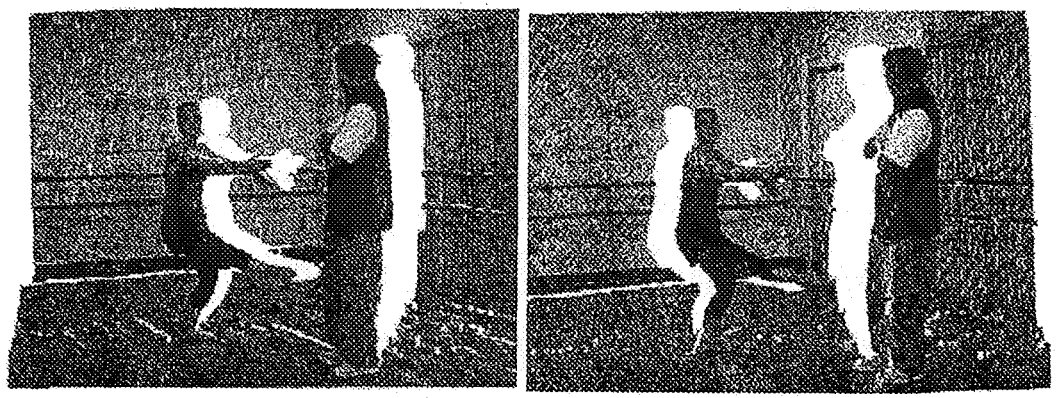
FIG. 12 shows images resulting from a projection of a central view image into two side views with omitting the left-away boundary portion.

In the next step, the central view with color and depth is projected into both side views, omitting the background boundary layer, as shown in FIG. 12 which, thus, shows a projection of central view into both side views. This corresponds to block 46 in FIG. 1c.

This way, the disoccluded areas (shown in white along the foreground objects and image boundaries in FIG. 12 and corresponding to 50 in FIG. 1c) become larger, leading finally also to larger residual areas in the side views. Due to the forward projection process, small uncovered areas also become visible, which are eliminated by crack removal filtering (a median filter that operates on outlier background depth values in foreground areas, compare block 58 in FIG. 1c). For this, one-pixel-wide unassigned depth values are identified that are surrounded by valid ones. Color and depth values are then interpolated from these neighboring valid values. After this filling, only true disoccluded areas (corresponding to 50 in FIG. 1c) remain, as shown in FIG. 13 which, thus, shows the data filling in projected central view.

This information is used to extract (or determine, as in block 54 in FIG. 1c) the necessitated residual information from the side views. Here, the exclusion difference between side view and projected central view is taken to obtain this information, as shown in FIG. 14 which, thus, shows residual data in both side views. In other words, the areas of the side views where the disoccluded areas of FIG. 13 overlay these side views, are chosen to be inserted into signal 32.

Figure 13:
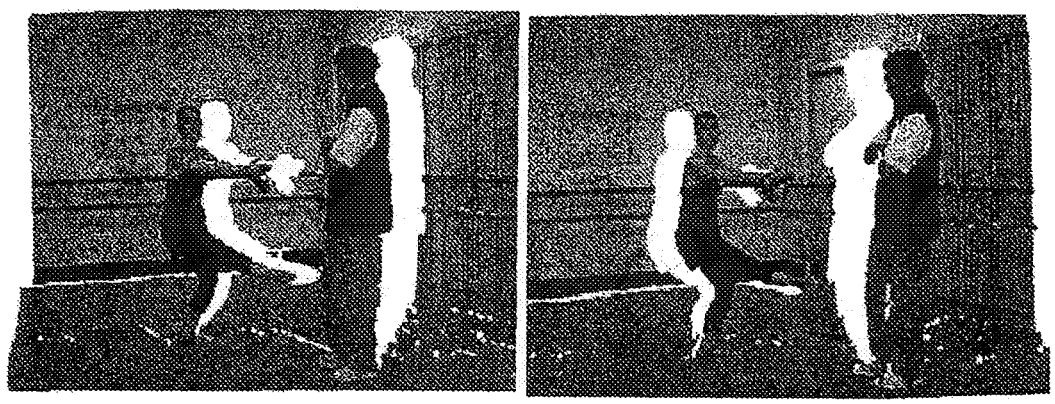
FIG. 13 shows two images obtained from the images of FIG. 12 by filtering for removing 1-pixel-wide undesired depth values to obtain the disoccluded areas according to an embodiment.
Figure 14:
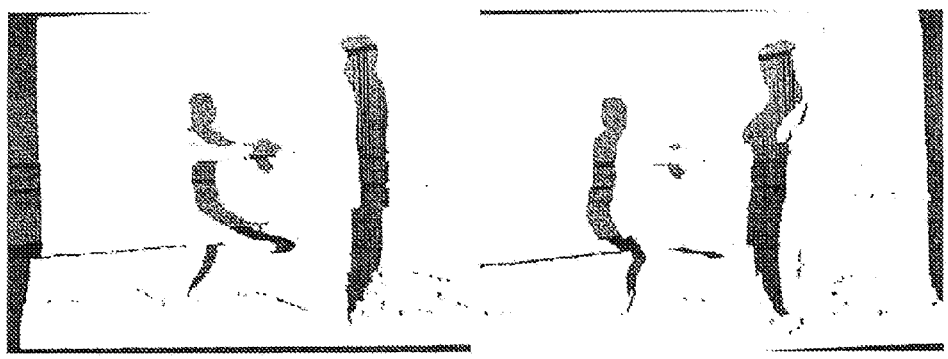
FIG. 14 shows the result of the exclusion difference between the side views and the projected central view of FIG. 13 according to an embodiment.

That means, residual data exists, where the projected and interpolated main view has no valid information (White areas in FIG. 13). This residual information is slightly larger than the pure disoccluded areas due to the before-mentioned subtraction of the background boundary layer in the central view. Thus, additional information is available in the residual data for reduction of color artifacts along object boundaries. Again, this residual data extraction is applied to color and depth data.

This concludes the LDV extraction process and gives the final LDV data format—as an example for the signal 32 in FIG. 1c—to be used for transmission purposes, which consists of:
  Full central view in color and depth
  Residual side views in color and depth
  Additional geometry parameter, like camera parameter and real-world depth range parameter Consider that in case of a MVD representation, 3 views with corresponding depth maps should be transmitted to support the same functionality as provided by this LDV representation. For LDV the side views are reduced to the residuals as shown in FIG. 14, which will result in a significantly reduced data rate. Concrete investigation of this increased compression performance is, however, subject to our future research. A slight increase of data rate is expected by the layered approach, since areas are slightly overlapping to avoid corona artifacts. Concrete cost in terms of bitrate increase still needs to be investigated.

Figure 15:
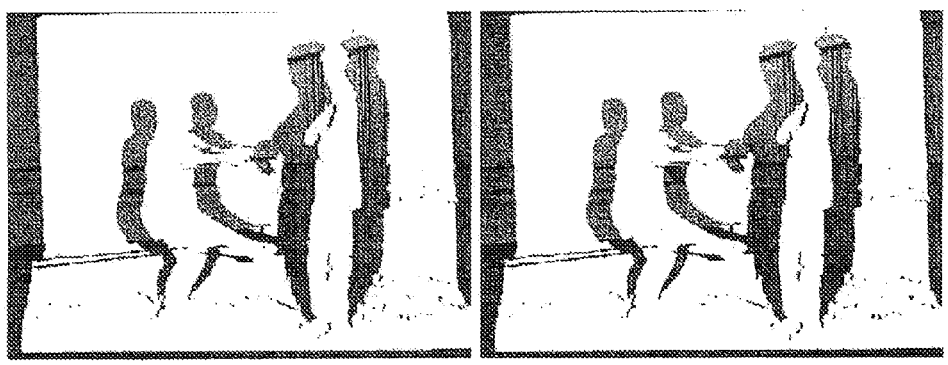
FIG. 15 shows different residual data variants according to embodiments.
Figure 15:
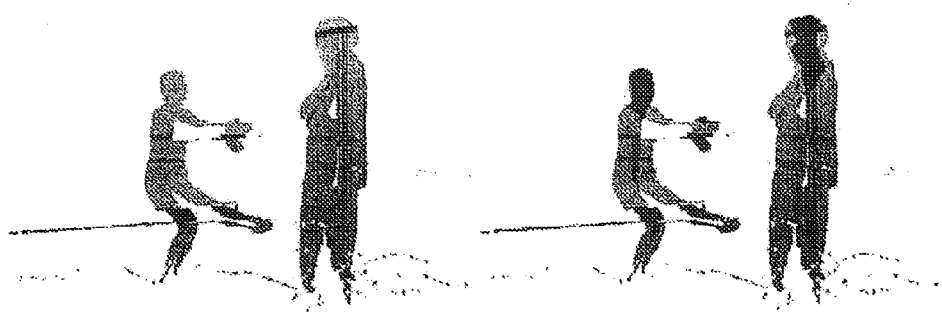

For finding the optimal residual data representation in terms of data coverage and possible compression purposes, two variants have been investigated: Merging of residual data into one buffer and projection of residual data towards the central view. The first variant is shown in FIG. 15, top left. Here, residual data from both side views may randomly overlap, as indicated by the red areas in FIG. 15, top right. This may lead to distortions due to different colors or illumination in the side views, which are also visible in the synthesized views. In other words, FIG. 15 shows residual data variants: Merged residual color data (Top) vs. merged projected color (Bottom) and associated marking of overlapping areas (Bottom).

In the second variant, the residual information was projected towards the central view to better align the residual data of both side views. Here, however, a considerable loss of information due to projection occurs in single residual buffers as well as in the merged buffer version, as shown in FIG. 15 bottom left: Here, the entire boundary data has disappeared in comparison to FIG. 15, top. If this approach is followed, either this data had to be extrapolated during view synthesis or a larger residual buffer is necessitated to provide space for all information. Again, the data overlap has been marked to show that even more information overlaps in this variant, indicating more visible artifacts in the synthesis process.

After receiving the LDV data, a view synthesis algorithm is applied to generate intermediate views.

The view synthesis consists of three parts, similar to [34]: Layer Extraction (edge detection and separation into reliable and boundary regions), Layer Projection (separate DIBR of regions and fusion) and Intermediate View Enhancement (correction, cleanup and filtering). These steps are similar to full multiview+depth intermediate view synthesis, but need to be adapted to LDV in its implementation.

Again, a layer extraction is performed first. The idea to work with a layered approached was already investigated in [30] for the application of free viewpoint navigation, where a boundary layer of a 7-sample-wide area is marked as unreliable along the detected edges. In contrast to [30], this area is split into a foreground and background boundary layer, as shown in FIG. 2 as blue and green areas respectively to allow different processing, as shown in the next subsection.

Then layer projection is performed. Central view and residual information are projected onto the intermediate view to be synthesized.

The intermediate view projection is carried out as classical image-based 3D warping: First, samples of original 2D views are projected into the 3D space, using associated depth values with camera calibration and real depth information. Second, the resulting 3D world points are forward projected into the intermediate view to be generated. The projection matrix for the second step, which is defining the virtual view position, is interpolated from the matrices of the two original views involved, using a position dependent parameter $\lambda \epsilon [0 \ldots 1]$, where $\lambda = 0.5$ for instance defines the middle position. This is done with linear interpolation for all camera parameters, except the rotation parameters, which necessitate spherical linear interpolation [24] to maintain the rotation matrix orthonormality.

Figure 16:
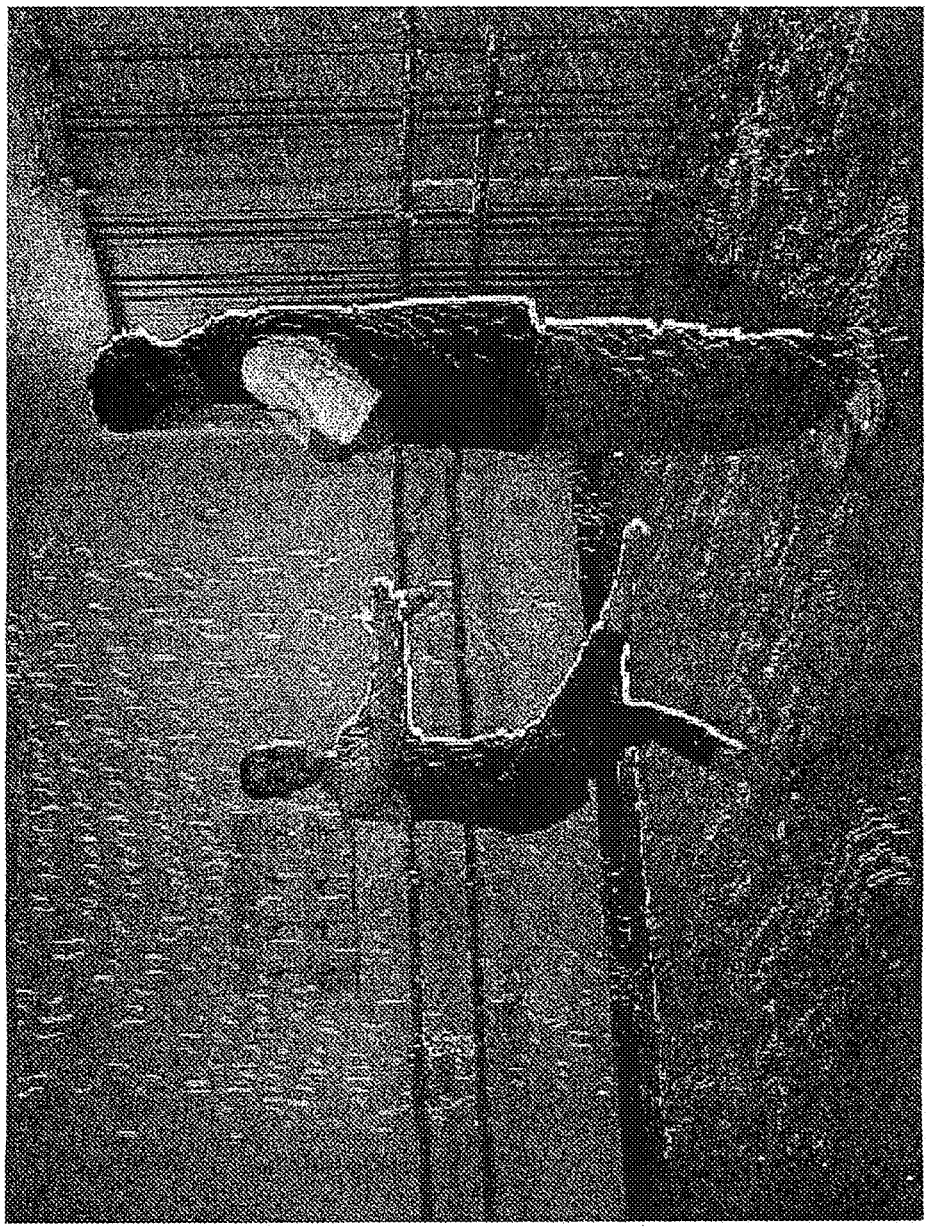
FIG. 16 shows another intermediate view resulting from a projection of two side views, according to an embodiment.

Following this approach, we separately interpolate views between the central view and each side view. The layer projection starts by projecting the main layer of the central view into the intermediate color buffer $l_i$ and corresponding floating-point depth data $d_i$. Afterwards, the residual data from the appropriate side view is also projected into the intermediate view and used to fill the disoccluded areas in $l_i$ and $d_u$. The resulting common main layer $l_i$ is shown in FIG. 16.

In the next step, the foreground boundary layer from the central view is projected and merged with the common main layer. This is also applied to color and floating-point depth. For merging, a simple depth test is used: The front-most sample from either layer is taken, which is mostly the foreground boundary sample. In other words, FIG. 16 shows a common main layer after projection.

In the last step, the background boundary layer is projected. This information is only used to fill remaining holes in the intermediate view. Since the common main layer together with the foreground layer already covers most of the samples, as can be seen in FIG. 16, only few background boundary samples are used. Thus, the color-distorted samples at object boundaries from the original views are omitted, which cause corona-like artifacts within background regions. In our LDV data extraction algorithm, the residual information was enlarged and thus already covers those critical areas before the possibly distorted background boundary layer is projected.

Lastly Intermediate View Enhancement is performed. This last part of the algorithm is again similar to [34] and applies correction, cleanup and filtering of the synthesized view. Here, two types of holes may occur: small cracks and larger missing areas. Cracks are caused by the forward warping nature of the projection. They are detected in the depth buffer as thin lines in the depth buffer with considerably different values in comparison to neighboring depth values. After detection, cracks are filled in the color buffer from neighboring values.

The second type of holes include larger missing areas. They either occur due to erroneous depth values, or are areas that become visible in the intermediate view, while being occluded in both original views. Such larger holes are filled with neighboring available background information. Here, corresponding depth values along the hole boundary are analyzed to find background color samples to be extrapolated into the hole region. While this approach leads to good filling results for missing areas due to depth errors, fillings for disocclusions are sometimes incorrectly taken from foreground information and thus exhibit wrong colors.

Finally, foreground objects are low-pass filtered along the edges to provide a natural appearance. In the original views, object boundary samples are a color mixture of foreground and background objects due to initial sampling and filtering during image capturing. In the rendered intermediate views of our layered approach, these mixed color samples are often excluded, in order to avoid corona artifacts in the background. Consequently, some foreground-background boundaries look unnaturally sharp, as if foreground objects are artificially inserted into the scene. Therefore, the above-mentioned Canny edge detection filter [2] is applied to the final depth information to identify edges and an averaging low-pass filter is applied to the corresponding color samples to provide a more natural appearance. Additionally, the filtering helps to reduce remaining artifacts along depth discontinuities.

Figure 17:
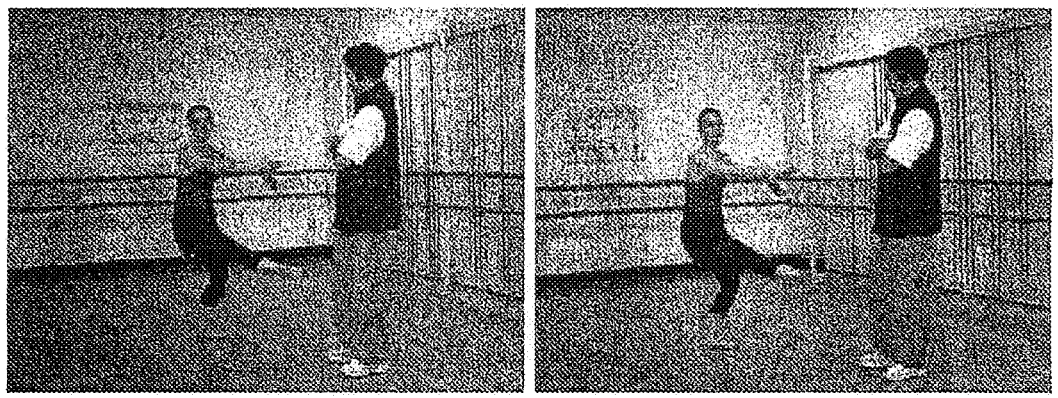
FIG. 17 shows a final view synthesis image after filtering, namely the center view plus left residual data on the left hand side and the central view plus the right residual data on the right hand side according to an embodiment.

The reconstructed side views, using the LDV data from the central view and residual side view data are shown in FIG. 17. In other words, FIG. 17 shows a final view synthesis after filtering with central view+left residual data (left) and central+right residual data (right).

Figure 18:
FIG. 18 shows detailed portions of intermediate views resulting from intermediate view synthesis by simple merging on the one hand and intermediate view synthesis according to an embodiment of the present invention on the other hand.

The reconstructed side views are of good quality and have no strongly visible distortions, like corona artifacts. These artifacts are suppressed due to the proposed LDV extraction process, where the residual layer data was expanded. The advantage of this method is shown in FIG. 18 for magnified areas, where a classical straight-forward LDV approach with non-expanded residual data is compared against our approach. In other words, FIG. 18 shows a comparison between classical LDV (left) and our LDV with residual layer expansion (right).

Figure 19:
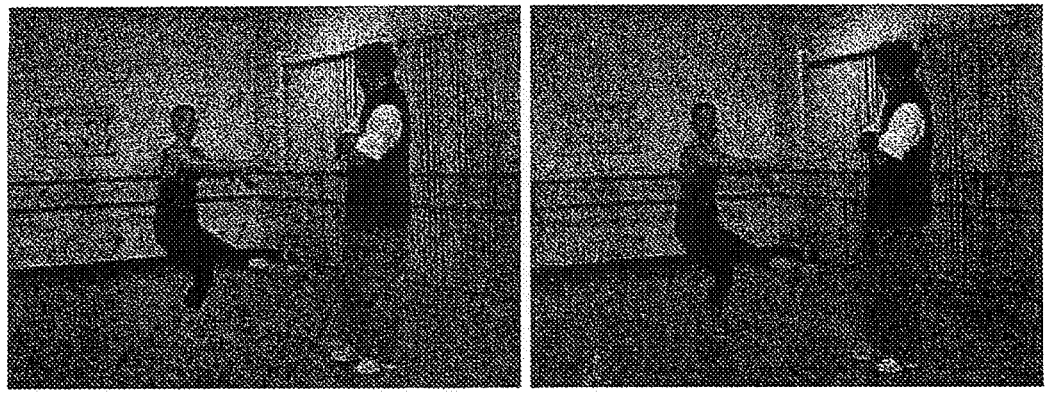
FIG. 19 shows a comparison between intermediate view synthesis images for LDV and MVD.

However, due to the limited nature of LDV data that only uses one central view together with residual data from the side views, some color differences are visible. A direct comparison of view synthesis for LDV and full multiview video plus depth (MVD) is shown in FIG. 19. In other words, FIG. 19 shows a comparison between intermediate view synthesis for LDV (left) and MVD (right).

While the intermediate view for LDV exhibits some color discrepancies, e.g. the shadow-like areas to the left of the ballet dancer in FIG. 19 left, the intermediate view in MVD shows no such artifacts.

The purpose of the view interpolator is to create N input views for a 3DV system out of M views plus depth of an MVD representation. One example is the Philips auto-stereoscopic display, where 9 views with eye-distance (approximately 5 cm) are necessitated as input. For such a setup, five of the resulting nine views are shown in FIG. 6 for the Ballet and Breakdancers data set. Here, each second view is shown, which comprises the central view, as well as the synthesized side views and intermediate views. With all 9 views, pair-wise stereoscopic views are available to support motion parallax and 3D depth impression.

Summarizing the third embodiment, a layered-depth video (LDV) representation format for advanced 3D video (3DV) systems has been presented. After showing the 3D video system concept, the creation of LDV data is explained for a triple camera setting, where the full image data of the central camera is used together with residual information from two side cameras. To minimize visual artifacts along object boundaries, a layer-based approach is used to obtain additional residual information in unreliable areas along such boundaries. Thus the residual data covers slightly more pixels, than the mere disocclusion difference between the projected central view and the side view would generate.

For the view synthesis at the 3D display, the layer-based approach is also used to reduce visible artifacts. First, the reliable information of the central view is projected into the desired intermediate view, followed by the residual information of the associated side view to create the main layer.

Afterwards, the remaining unreliable information of the central view is projected as foreground and background boundary layer and merged differently with the main layer to reduce visual artifacts. Finally, view enhancement in the form of hole filling and low-pass filtering along object boundaries at significantly different depth values is applied to improve visual appearance of intermediate views.

With the introduced methods, a good quality intermediate view synthesis for the described 3D video concept based on LDV is demonstrated. A comparison to MVD showed only minor degradations in terms of different color illuminations in disoccluded areas for the LDV approach.

Future work will include efficient coding methods for the presented LDV format.

Thus, the above embodiments form, inter alias, algorithms for Quality Enhancement in the Context of Image Based Rendering (IBR) some of which use a specific processing of depth discontinuities, hole filling and dis-occlusion handling. Some of these embodiments may be used in advanced 3D video applications. Such applications include support of wide range autosteroscopic displays with, for example, nine and more views simultaneously and wide range free viewpoint navigation. Both of the latter ones may rely on data formats that combine multiple video and associated per pixel depth data. In Multiview Video plus Depth (MVD) format, full videos and full depth map videos may be used. In Layered Depth Video (LDV) format, merely one full video and associated full depth map video and one or more additional background layer videos with background layer depth map videos are used. In particular, the above described embodiments may be useful in intermediate view synthesis based on depth, i.e. image based rendering (IBR) or depth image based rendering (DIBR). Thus, they may be used to generate arbitrary views in order to support the envisaged applications. However, the above described embodiments enable overcoming the problems of, and efficiently addressing the necessities of such DIBR algorithms, whether for MVD or LDV. These Problems and necessities may comprise artifacts that appear along depth discontinuities due to different reasons, the necessity of performing hole filling due to the forward mapping approach for rendering, and finally the handling/filling of dis-occluded areas which are not available from the input data. The above described embodiments, address these problems in various ways. For example, in order to reduce artifacts a specific boundary processing is used for depth discontinuities. Depth discontinuities are detected in the depth images by edge detection. Images are divided into reliable areas, which are not along those depth discontinuities, and unreliable areas along those detected depth discontinuities. Reliable areas are processed using DIBR whereas specific/different processing is used for unreliable areas. The further division into foreground unreliable areas and background unreliable areas further increases the quality result. All the areas are processed separately and differently. Finally, a process that merges all the different processed image regions into the final output image has been presented. Additionally, a specific hole filling algorithm addressing forward mapping problems has been described. Finally, an efficient algorithm for filling of dis-occluded areas has been shown above.

It should be noted that several modifications may be made to the above embodiments. For example, the LDV extraction process presented within the second embodiment may be implemented such that the information transmitted for V1 and V9 indicates the division into non-boundary, background boundary region and foreground boundary region. Additionally or alternatively, the LDV extraction process may also be implemented such that the information transmitted for V5 indicates also the division into non-boundary, background boundary region and foreground boundary region so that the respective layer extraction process has not to be performed again as far as the edge detection and splitting into background and foreground is concerned. Same applies to the MVD embodiments described above. Further, the above described enhancement, correction, clean-up and filtering processes could, depending on the respective applications, be left away. The projections could be performed in another way so that, for example, no cracks occur. In particular, the projection could be performed less complex. This is especially true for cases where, for example, the views are arranged linearly and at parallel axes. For example, the projection may be performed by merely shifting the pixels along the baseline into the intermediate image. The amount of shifting may depend a deviation from the intermediate view and depth/disparity. Thus, the projection may be performed by, for example, using projection matrices for 3D projection or by simple pixel shift for specific parallel camera arrangements. Further, the separation into foreground and background boundary portions may be substituted by an easier approach according to which the boundary region as a whole, or another portion of a border along foreground and background may be treated as described above with respect to the background region.

Moreover, although in the above embodiments, the depth information was already provided to the intermediate view synthesis apparatus, i.e. at the receiver side, and the multi-view data signal extraction apparatus, i.e. the transmitting side, respectively, such as, for example, provided by a time-of-light camera or the like, these apparatus may be configured to estimate the depth information from the views, i.e. the pixel samples representing the luma and/or chroma information, itself. This is especially true at the receiver side. The depth information could be generated at the receiver rather then gaining this information from the multi-view signal. The latter, in turn, could be free of the depth information.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] S. Avidan, A. Shashua, "Novel view synthesis in tensor space". In *Conference on Computer Vision and Pattern Recognition*, pp 1034-1040, San Juan, Puerto Rico, 1997.

[2] J. F. Canny, "A computational approach to edge detection", *IEEE Trans. Pattern Analysis and Machine Intelligence*, Vol. 8, No. 6, pp. 679-698, November 1986.

[3] G.-C. Chang and W.-N. Lie, "Multi-view image compression and intermediate view synthesis for stereoscopic applications", *IEEE International Symposium on Circuits and Systems, ISCAS* 2000, pp. 277-280, 2000.

[4] N. L. Chang, A. Zakhor, "A multivalued representation for view synthesis", *Proc. IEEE International Conference on Image Processing (ICIP '99)*, pp. 505-509, October 1999.

[5] S. Chen, L. Williams, "View interpolation for image synthesis", *Computer Graphics (SIGGRAPH '93)*, pp. 279-288, 1993.

[6] O. Faugeras, "Three-dimensional computer vision: A geometric viewpoint", *MIT Press*, Cambridge, Mass., 1993.

[7] C. Fehn, P. Kauff, M. Op de Beeck, F. Ernst, W. Ijsselsteijn, M. Pollefeys, L. Vangool, E. Ofek, and I. Sexton, "An Evolutionary and Optimised Approach on 3D-TV", *IBC 2002, Int. Broadcast Convention*, Amsterdam, Netherlands, September 2002.

[8] F. Forsters, M. Lang, and B. Radig, "Real-time Range Imaging for Dynamic Scenes using colour-edge based Structured Light", in *Proc. Int. Conf. Pattern Recognition*, vol. 3, pp. 645-628, 2002.

[9] R. Hartley, A. Zisserman, "Multiple View Geometry in Computer Vision", *Cambridge University Press*, 2003

[10] ISO/IEC JTC1/SC29/WG11 "Description of Exploration Experiments in 3D Video", Doc. N9596, Antalya, Turkey, January 2008.

[11] ISO/IEC JTC1/SC29/WG11, "Text of ISO/IEC FDIS 23002-3 Representation of Auxiliary Video and Supplemental Information", Doc. N8768, Marrakech, Morocco, January 2007.

[12] ISO/IEC JTC1/SC29/WG11, "Text of ISO/IEC 13818-1:2003/FDAM2 Carriage of Auxiliary Data", Doc. N8799, Marrakech, Morocco, January 2007.

[13] Jong Dae Oh; Siwei Ma; Kuo, C.-C. J., "Disparity Estimation and Virtual View Synthesis from Stereo Video", IEEE International Symposium on Circuits and Systems, ISCAS 2007, pp. 993-996, May 2007.

[14] A. Katayama, K. Tanaka, T. Oshino, and H. Tamura, "A viewpoint dependent stereoscopic display using interpolation of multi-viewpoint images", S. Fisher, J. Merritt, and B. Bolas, editors, *Stereoscopic Displays and Virtual Reality Systems II, Proc. SPIE*, vol. 2409, pp. 11-20, 1995.

[15] P. Kauff, N. Atzpadin, C. Fehn, M. Müller, O. Schreer, A. Smolic, and R. Tanger, "Depth Map Creation and Image Based Rendering for Advanced 3DTV Services Providing Interoperability and Scalability", *Signal Processing: Image Communication. Special Issue on 3DTV*, February 2007.

[16] R. Koch, M. Pollefeys and L. Van Gool, "Multi Viewpoint Stereo from Uncalibrated Video Sequences", *Proc. European Conference on Computer Vision, ECCV '98*, LNCS, Springer-Verlag, Freiburg, 1998.

[17] J. Konrad and M. Halle, "3-D Displays and Signal Processing—An Answer to 3-D Ills?", *IEEE Signal Processing Magazine*, Vol. 24, No. 6, November 2007.

[18] Y. Li, C.-K. Tang, and H.-Y. Shum, "Efficient dense depth estimation from dense multiperspective panoramas," in *Proc. International Conference on Computer Vision (ICCV)*, Vancouver, B.C., Canada, July 2001, pp. 119-126.

[19] J. S. McVeigh, M. Siegel, and A. Jordan, "Intermediate view synthesis considering occluded and ambiguously referenced image regions", *Signal Processing: Image Communication*, vol. 9, pp. 21-28, 1996.

[20] P. Merkle, A. Smolic, K. Mueller, and T. Wiegand, "Efficient Prediction Structures for Multiview Video Coding", invited paper, *Proc. IEEE Trans. on Circuits and Systems for Video Technology*, Vol. 17, No. 11, November 2007.

[21] M. Morimoto, K. Fujii, "A view synthesis method based on object coding and simple disparity model", IEEE International Symposium on Communications and Information Technology, ISCIT 2004, vol. 2, pp. 853-856, October 2004.

[22] J. Salvi, J. Pages, and J. Battle, "Patter Codification Strategies in Structured Light Systems", *Pattern Recognition*, vol. 37, no. 4, pp. 827-849, 2004.

[23] D. Scharstein, "Stereo vision for view synthesis", *IEEE Computer Society Conference on Computer Vision and Pattern Recognition (CVPR '96)*, pp. 852-857, San Francisco, Calif., 1996.

[24] K. Shoemake, "Animating Rotation with Quaternion Curves", *ACM SIGGRAPH*, San Francisco, USA, July, 1985.

[25] A. Smolic, K. Müller, P. Merkle, C. Fehn, P. Kauff, P. Eisert, and T. Wiegand, "3D Video and Free Viewpoint Video—Technologies, Applications and MPEG Standards", *ICME* 2006, *IEEE International Conference on Multimedia and Expo*, Toronto, Ontario, Canada, July 2006.

[26] C. Strecha, T. Tuytelaars, and L. van Gool, "Dense Matching of Multiple wide-baseline Views," *In Proc. 9th IEEE International Conference on Computer Vision*, pp. 1194-1201, 2003.

[27] R. Y. Tsai, "A versatile camera calibration technique for high-accuracy 3D machine vision metrology using off-the-shelf TV camera and lenses", *IEEE Journal of Robotics and Automation*, vol. RA-3, no. 4, 1987.

[28] "Philips 3D Solutions" May 2006, Koninklijike Philips Electronics N. V.

[29] J. Woetzel and R. Koch, "Real-time multi-stereo depth estimation on GPU with approximative discontinuity handling", 1*st European Conference on Visual Media Production (CVMP* 2004), London, United Kingdom, March 2004

[30] C. L. Zitnick, S. B. Kang, M. Uyttendaele, S. Winder, and R. Szeliski, "High-Quality Video View Interpolation Using a Layered Representation", *ACM SIGGRAPH and ACM Trans. on Graphics*, Los Angeles, Calif., USA, August 2004.

[31] C. Chang, G. Bishop, and A. Lastra, "LDI tree: A hierarchical representation for image-based rendering," in *Proceedings of ACM SIGGRAPH* '99, Los Angeles, Calif. USA, 1999, pp. 291-298.

[32] X. Cheng, L. Sun, S. Yang, "Generation of Layered Depth Images from Multi-View Video", *Proc. IEEE International Conference on Image Processing (ICIP* '07), San Antonio, Tex., USA, vol. 5, pp: 225-228, September 2007.

[33] J. Shade, S. Gortler, L. Hey, and R. Szeliski, "Layered depth images", in *Proceedings of ACM SIGGRAPH* '98, Orlando, Fla., 1998, pp. 231-242.

[34] A. Smolic, K. Müller, K. Dix, P. Merkle, P. Kauff, and T. Wiegand, "Intermediate View Interpolation based on Multi-View Video plus Depth for Advanced 3D Video Systems", to be published in *Proc. IEEE International Conference on Image Processing (ICIP* '08), San Diego, Calif., USA, October 2008.

The invention claimed is:

1. An intermediate view synthesis method for synthesizing an intermediate view image from a first image corresponding to a first view and a second image corresponding to a second view different from the first view, the first and second images comprising depth information, wherein the second image is divided-up into a non-boundary portion and a foreground/background boundary region, wherein the foreground/background boundary region of the second image comprises a foreground boundary portion and a background boundary portion being disjoint to the foreground boundary portion, and wherein the intermediate view synthesis method comprises
    projecting and merging the first image and the second image into the intermediate view to achieve an intermediate view image, with using the background boundary portion of the foreground/background boundary region merely to fill holes otherwise occurring in the intermediate view image, and using the foreground boundary portion of the foreground/background boundary region, to project and merge into the intermediate view, the projecting and merging the first image and the second image comprising
        projecting and merging, by a projector/merger, the non-boundary portion and the foreground boundary portion of the second image along with at least a part of the first image into the intermediate view to achieve a preliminary intermediate view image; and
        by a projector/filler, projecting the background boundary portion of the second image into, and filling the holes in the preliminary intermediate view image by the projected background boundary portion of the second image; and
    enhancing, by an enhancer, the intermediate view image by detecting a foreground/background boundary region of the intermediate view image and low-pass filtering within the foreground/background boundary region of the intermediate view image,
    wherein at least one of the projector/merger, the projector/filler or the enhancer comprises a hardware implementation.

2. An intermediate view synthesis method for synthesizing an intermediate view image from a first image corresponding to a first view and a second image corresponding to a second view different from the first view, the first and second images comprising depth information, wherein the second image is divided-up into a non-boundary portion and a foreground/background boundary region, wherein the foreground/background boundary region of the second image comprises a foreground boundary portion and a background boundary portion being disjoint to the foreground boundary portion, and wherein the intermediate view synthesis method comprises:
    detecting, by a detector, the foreground/background boundary region in the second image;
    dividing-up, by a divider, the foreground/background boundary region of the second image into the foreground boundary portion and the background boundary portion so that the second image is divided-up into the non-boundary portion, the foreground boundary portion and the background boundary portion;
    projecting and merging, by a projector/merger, the non-boundary portion and the foreground boundary portion of the second image along with at least a part of the first image into the intermediate view to achieve a preliminary intermediate view image; and
    by a projector/filler, projecting the background boundary portion of the second image into, and filling the holes in the preliminary intermediate view image by the projected background boundary portion of the second image,
    wherein at least one of the detector, the divider, the projector/merger or the projector/filler comprises a hardware implementation.

3. The method according to claim 2, wherein the intermediate view synthesis method further comprises acquiring layer information discriminating the non-boundary portion, the foreground boundary portion and the background boundary portion of the second image from a multi-view data signal.

4. The intermediate view synthesis method according to claim 2, wherein the detecting comprises detecting also a foreground/background boundary region in the first image, the dividing-up comprises also dividing-up the foreground/background boundary region of the first image into a foreground boundary portion and a background boundary portion so that the first image is also divided-up into a non-boundary portion, a foreground boundary portion and a background boundary portion, and the projecting and merging comprises projecting and merging the non-boundary portion and the foreground boundary portion of the first and second images into the intermediate view to achieve the preliminary intermediate view image, and the projecting and filling comprises projecting the background boundary portion of the first and second images into and fill the holes in the preliminary intermediate view image by the projected background boundary portion of the first and second images.

5. The intermediate view synthesis method according to claim 4, wherein the projecting and merging comprises projecting and merging the non-boundary portion of the first and second images into the intermediate view to achieve a non-boundary intermediate view image, with the merging of the non-boundary portion comprising averaging between the first and second images, and projecting and merging the foreground boundary portion of the first and second images into the non-boundary intermediate view image with the merging of the foreground boundary portion comprising a selection between samples of the non-boundary intermediate view image and co-located samples resulting from the projection of the foreground boundary portion of the first and second images rather than an averaging thereof.

6. The intermediate view synthesis method according to claim 2, wherein the intermediate view synthesis method comprises acquiring layer information discriminating, at least, a non-boundary portion and a background boundary portion of the first image from a multi-view data signal, wherein the projecting and merging comprises projecting and merging the non-boundary portion and the foreground boundary portion of the second image and the non-boundary portion of the first image into the intermediate view to achieve the preliminary intermediate view image, and the projecting and filling comprises projecting the background boundary portion of the first and second images into and filling the holes in the preliminary intermediate view image by the projected background boundary portion of the first and second images.

7. The intermediate view synthesis method according to claim 2, wherein the intermediate view synthesis method comprises acquiring layer information discriminating a non-boundary portion, a foreground boundary portion and a background boundary portion of the first image, wherein the projecting and merging comprises projecting and merging the non-boundary portion and the foreground boundary portion of the first and second images into the intermediate view to achieve the preliminary intermediate view image, and the projecting and filling comprises projecting the background boundary portion of the first and second images into and filling the holes in the preliminary intermediate view image by the projected background boundary portion of the first and second images.

8. The intermediate view synthesis method according to claim 2, wherein the detecting a foreground/background boundary region is performed using edge detection for detecting an edge in the depth information.

9. The intermediate view synthesis method according to claim 2, wherein the dividing-up comprises splitting an n-sample-wide area around the edge as the foreground/background boundary region into the foreground boundary portion and the background boundary portion.

10. The intermediate view synthesis method according to claim 2, wherein the dividing-up is configured to comprises comparing a depth of the depth information at a sample of the foreground/background boundary region with a threshold to decide as to whether the sample belongs to the foreground boundary portion or the background boundary portion.

11. The intermediate view synthesis method according to claim 10, wherein the dividing-up comprises deriving the threshold value by computing a central tendency of depth values of the depth information at samples of the foreground/background boundary region neighboring the sample.

12. The intermediate view synthesis method according to claim 2, wherein the projecting and merging and the projecting and filling comprise performing the respective projection into the intermediate view by projecting samples from 2D to 3D by use of the associated depth information to achieve 3D world points and projecting the 3D world points into the intermediate view.

13. The intermediate view synthesis method according to claim 12, wherein the projecting and merging and the projecting and filling comprise computing a projecting matrix by interpolating between projecting matrices of the first view and the second view and performing the projection of the 3D world points by use of the projection matrix.

14. The intermediate view synthesis method according to claim 2, wherein the projecting and merging and the projecting and filling comprise performing the respective projection into the intermediate view by in-pixel-plane shifting the sample positions at an amount depending on a deviation from the intermediate view.

15. The intermediate view synthesis method according to claim 2, wherein the intermediate view synthesis method comprises extracting from a multi-view data signal the first image corresponding to the first view and the second image corresponding to the second view, comprising the depth information of the first and second images, wherein merely the part of the first image is comprised by the multi-view data signal while the disjoint portion thereof is discarded in the multi-view data signal, the part of the first image depending on a location of a disoccluded area within a projected version of the second image resulting from projecting the second image without the background boundary portion into the first view.

16. The intermediate view synthesis method according to claim 2, further comprising:
enhancing the intermediate view image by filtering and/or extrapolation into remaining holes of the intermediate view image.

17. The intermediate view synthesis method according to claim 2, wherein the first and second images are part of an MVD or LDV video.

18. The intermediate view synthesis method according to claim 2, wherein the first and second images comprise color information associated with the depth information.

19. The intermediate view synthesis method according to claim 2, the intermediate view synthesis method is performed within a 3DTV display system.

* * * * *